United States Patent
Elango et al.

(10) Patent No.: US 12,288,552 B2
(45) Date of Patent: Apr. 29, 2025

(54) COMPUTER SYSTEMS AND COMPUTER-BASED METHODS FOR AUTOMATED CALLER INTENT PREDICTION

(71) Applicant: Optum, Inc., Minnetonka, MN (US)

(72) Inventors: Vivedha Elango, Chennai (IN); Soundararajan Dhakshinamoorthy, Chennai (IN); Srividya Thyagarajan, Chennai (IN); Ninad D. Sathaye, Bangalore (IN); Gregory J. Boss, Saginaw, MI (US); Santhosh Kumar Gopynadhan, Chennai (IN)

(73) Assignee: Optum, Inc., Minnetonka, MN (US)

( * ) Notice: Subject to any disclaimer, the term of this patent is extended or adjusted under 35 U.S.C. 154(b) by 217 days.

(21) Appl. No.: 17/478,157

(22) Filed: Sep. 17, 2021

(65) Prior Publication Data

US 2023/0102179 A1    Mar. 30, 2023

(51) Int. Cl.
*G10L 15/18*    (2013.01)
*G06F 40/279*    (2020.01)
(Continued)

(52) U.S. Cl.
CPC ........ *G10L 15/1815* (2013.01); *G06F 40/279* (2020.01); *G06F 40/30* (2020.01);
(Continued)

(58) Field of Classification Search
CPC ..... G10L 15/1815; G10L 15/22; G10L 25/63; G10L 2015/088; G06F 40/279;
(Continued)

(56) References Cited

U.S. PATENT DOCUMENTS

| | | |
|---|---|---|
| 7,110,525 B1 | 9/2006 | Heller et al. |
| 7,411,942 B1 | 8/2008 | Croak et al. |

(Continued)

OTHER PUBLICATIONS

Balduino, Ricardo. "AI and Machine Learning To Improve Customer Contact Experience," Inside Machine Learning, Oct. 29, 2019, (9 pages), (article, online), [Retrieved from the Internet Nov. 1, 2021] <URL: https://medium.com/inside-machine-learning/ai-and-machine-learning-to-improve-customer-contact-experience-3f5e551b2236>.

(Continued)

*Primary Examiner* — Paras D Shah
*Assistant Examiner* — Fouzia Hye Solaiman
(74) *Attorney, Agent, or Firm* — Alston & Bird LLP

(57) ABSTRACT

An automated system and corresponding method is configured to predict a call duration of a customer service interaction between a caller and a customer-service agent of a call center, based at least in part on information provided orally by the caller to the automated system. The automated system transcribes the orally provided information, preprocesses the transcribed data, adds feature enrichment data to supplement the transcribed data, and executes a machine-learning model to predict the caller's intent. If the predicted caller's intent does not have an adequate confidence score associated therewith, the system requests additional data from the caller, and supplements the original data with newly provided data, and again determines a predicted call intent. This process may iterate until the confidence score satisfies applicable confidence criteria prior to utilizing two additional machine-learning models to predict a call duration of the interaction between the caller and a customer-service agent.

29 Claims, 11 Drawing Sheets

(51) Int. Cl.
- *G06F 40/30* (2020.01)
- *G06N 5/022* (2023.01)
- *G06N 5/04* (2023.01)
- *G06Q 30/016* (2023.01)
- *G10L 15/08* (2006.01)
- *G10L 15/22* (2006.01)
- *G10L 25/63* (2013.01)
- *H04M 3/51* (2006.01)

(52) U.S. Cl.
CPC ............... *G06N 5/022* (2013.01); *G06N 5/04* (2013.01); *G06Q 30/016* (2013.01); *G10L 15/22* (2013.01); *G10L 25/63* (2013.01); *H04M 3/51* (2013.01); *G10L 2015/088* (2013.01)

(58) Field of Classification Search
CPC ...... G06F 40/30; G06F 40/216; G06F 40/284; G06F 40/35; G06N 5/022; G06N 5/04; G06N 3/088; G06N 3/0442; G06N 3/0455; G06N 3/091; G06N 5/01; G06N 20/20; G06Q 30/016; H04M 3/51; H04M 2201/40; H04M 2203/556; H04M 3/5175
USPC ........................................................ 704/235
See application file for complete search history.

(56) References Cited

U.S. PATENT DOCUMENTS

| | | | |
|---|---|---|---|
| 7,827,047 | B2 | 11/2010 | Anderson et al. |
| 8,244,566 | B1 | 8/2012 | Coley et al. |
| 8,565,412 | B2 | 10/2013 | Foster et al. |
| 8,750,488 | B2 | 6/2014 | Spottiswoode et al. |
| 8,792,632 | B2 | 7/2014 | Anisimov et al. |
| 8,942,986 | B2 | 1/2015 | Cheyer et al. |
| 9,129,290 | B2 | 9/2015 | Kannan et al. |
| 9,148,512 | B1 * | 9/2015 | Kumar ................ H04M 3/5183 |
| 9,167,095 | B1 | 10/2015 | Selvin et al. |
| 9,401,992 | B2 | 7/2016 | Srinivas et al. |
| 9,712,671 | B2 | 7/2017 | Monegan et al. |
| 10,270,914 | B2 | 4/2019 | Shaffer et al. |
| 10,579,834 | B2 | 3/2020 | Walia |
| 10,614,799 | B2 | 4/2020 | Kennewick, Jr. et al. |
| 10,714,084 | B2 | 7/2020 | Engles et al. |
| 10,810,274 | B2 * | 10/2020 | Thomson ........... H04N 21/4826 |
| 10,839,432 | B1 | 11/2020 | Konig et al. |
| 10,904,212 | B1 * | 1/2021 | Kaizer .................... H04L 51/52 |
| 10,992,808 | B1 | 4/2021 | Dhawan et al. |
| 11,558,210 | B2 | 1/2023 | Suhail et al. |
| 11,798,547 | B2 | 10/2023 | Milden |
| 2002/0191035 | A1 | 12/2002 | Selent |
| 2004/0029567 | A1 | 2/2004 | Timmins et al. |
| 2007/0025540 | A1 | 2/2007 | Travis |
| 2007/0198368 | A1 | 8/2007 | Kannan et al. |
| 2008/0059265 | A1 | 3/2008 | Biazetti et al. |
| 2008/0298350 | A1 | 12/2008 | Croak et al. |
| 2008/0313005 | A1 | 12/2008 | Nessland et al. |
| 2011/0009096 | A1 | 1/2011 | Rotsztein et al. |
| 2012/0076283 | A1 | 3/2012 | Ajmera et al. |
| 2013/0268310 | A1 | 10/2013 | Wilson |
| 2014/0006082 | A1 | 1/2014 | Harms et al. |
| 2014/0044243 | A1 | 2/2014 | Monegan et al. |
| 2014/0086404 | A1 | 3/2014 | Chishti et al. |
| 2014/0379407 | A1 | 12/2014 | Horton |
| 2015/0030151 | A1 | 1/2015 | Bellini et al. |
| 2015/0181038 | A1 | 6/2015 | Fox et al. |
| 2015/0213512 | A1 * | 7/2015 | Spievak ............. G06Q 30/0275 705/14.71 |
| 2015/0347980 | A1 | 12/2015 | White et al. |
| 2015/0358460 | A1 * | 12/2015 | Monegan ............. G06Q 30/016 379/88.01 |
| 2017/0034349 | A1 | 2/2017 | Uba |
| 2017/0111505 | A1 * | 4/2017 | McGann ............. H04M 3/5191 |
| 2017/0111509 | A1 * | 4/2017 | McGann ............. H04M 3/5238 |
| 2017/0116177 | A1 | 4/2017 | Walia |
| 2018/0276723 | A1 | 9/2018 | Kannan |
| 2018/0309801 | A1 * | 10/2018 | Rathod ............... H04M 3/5175 |
| 2020/0014801 | A1 | 1/2020 | Mohiuddin et al. |
| 2020/0036544 | A1 | 1/2020 | Suhail et al. |
| 2020/0257857 | A1 * | 8/2020 | Peper ...................... G06F 40/35 |
| 2020/0274969 | A1 | 8/2020 | Dunn et al. |
| 2020/0334615 | A1 * | 10/2020 | Benjamin ............ G06Q 30/016 |
| 2020/0342850 | A1 * | 10/2020 | Vishnoi .................... G06F 40/30 |
| 2020/0374402 | A1 | 11/2020 | Adibi |
| 2021/0004825 | A1 * | 1/2021 | Adibi ...................... H04L 51/02 |
| 2021/0029248 | A1 * | 1/2021 | Scodary ............ G06F 18/24155 |
| 2021/0103937 | A1 * | 4/2021 | Joglekar ................ G06F 21/552 |
| 2021/0201238 | A1 | 7/2021 | Sekar et al. |
| 2021/0273980 | A1 | 9/2021 | Palandurkar et al. |
| 2021/0280195 | A1 * | 9/2021 | Srinivasan ............. G06F 3/167 |
| 2021/0350334 | A1 | 11/2021 | Ave et al. |
| 2022/0182493 | A1 * | 6/2022 | Ter ...................... H04M 3/5238 |
| 2023/0090049 | A1 | 3/2023 | Elango et al. |
| 2023/0376987 | A1 | 11/2023 | Doumar et al. |

OTHER PUBLICATIONS

Zhong, Junmei et al. "Predicting Customer Call Intent By Analyzing Phone Call Transcripts Based on CNN For Multi-Class Classification," arXiv preprint arXiv:1907.03715, Jul. 8, 2019, (12 pages).

Parnandi, Avinash et al. "A Comparative Study of Game Mechanics and Control Laws For an Adaptive Physiological Game," Journal of Multimodal User Interfaces, vol. 9, pp. 31-42, Mar. 2015, DOI: 10.1007/s12193-014-0159-y.

NonFinal Office Action for U.S. Appl. No. 17/448,001, dated Mar. 17, 2023, (22 pages), United States Patent and Trademark Office, US.

Final Rejection Mailed on Dec. 28, 2023 for U.S. Appl. No. 17/448,001, 19 page(s).

Non-Final Rejection Mailed on Jun. 21, 2024 for U.S. Appl. No. 17/448,001, 20 page(s).

Notice of Allowance and Fees Due (PTOL-85) Mailed on Dec. 27, 2024 for U.S. Appl. No. 17/448,001, 16 page(s).

Supplemental Notice of Allowance and Fees Due (PTOL-85) Mailed on Jan. 13, 2025 for U.S. Appl. No. 17/448,001, 3 page(s).

* cited by examiner

COMPUTER SYSTEMS AND COMPUTER-BASED METHODS FOR AUTOMATED CALLER INTENT PREDICTION

BACKGROUND

Call centers employed by businesses for providing customer-service to callers face a unique challenge of needing to address the needs of callers with minimal time and with minimal information about the caller and the caller's intent. Because of the limited information available to the call center upon receipt of a call from a caller, the call center must route the call to a customer service agent (a human customer service agent or an automated customer service agent) based on the minimal information made available to the call center. The caller may thus be routed to an inexperienced customer service agent, a customer service agent without appropriate permissions/authority to assist the caller, or to an otherwise non-optimal customer service agent that provides a generally unpleasant and lengthy experience for the caller. Moreover, call centers are generally incapable of determining an estimated time for resolution of the caller's intent at least in part because of the limited information made available to the call center. Therefore, a caller is occasionally forced to end a customer-service interaction before it is completed if the customer-service interaction takes longer than expected. The caller may then be required to call the call-center again later and completely restart the customer-service interaction.

Therefore, a need exists for systems and methods for improving existing call-center computing systems and methods to address these and other problems.

BRIEF SUMMARY

Various embodiments provide callers to a call center with a predicted call duration for addressing the callers' concerns during the call. Various embodiments utilize a plurality of machine-learning models to collectively determine a caller's intent, to determine an estimated call duration based on the caller's intent, and to adjust the estimated call duration based at least in part on attributes associated with a customer-service agent tasked with addressing the call. To maintain high levels of accuracy and precision in providing an estimated call duration, the described system uses an iterative inquiry system to obtain additional information from the caller (e.g., via an audio-based interaction) until the system is capable of determining a likely call intent and a predicted call duration estimate that satisfies applicable confidence criteria. The predicted call duration estimate can be provided to the caller (e.g., via audio output), and the caller can then determine whether to continue the current call, or to schedule a call for a later time to complete the interaction.

Certain embodiments are directed to an automated voice-based call-analysis system comprising: one or more memory storage areas; and one or more processors collectively configured to: iteratively execute a call-intent determination model, at least in part, by: receiving audio comprising a caller's voice for a call; executing a voice-to-text conversion of the audio to generate transcription data; extracting one or more keywords from the transcription data; executing a machine-learning intent model to determine a call intent and a corresponding call intent score; upon determining that the corresponding call intent score satisfies inquiry criteria, generating an audio output requesting additional audio input from the caller providing additional detail for use as input to the machine-learning intent model; execute a call-time prediction model at least in part by: executing a first machine-learning time model to determine an unadjusted time estimate based at least in part on the call intent; and executing a second machine-learning time model to determine a time adjustment based at least in part on a customer service agent assigned to the call; determining a call-time prediction based at least in part on the unadjusted time estimate and the time adjustment; and generating an audio output providing the call-time prediction to the caller.

In certain embodiments, extracting one or more keywords from the transcription data comprises executing a term-frequency, inverse-document frequency (TF-IDF) algorithm to identify keywords within a corpus of historical training data, wherein the historical training data comprises transcription data generated during a plurality of historical calls. In various embodiments, executing the machine-learning intent model to determine a call intent and a corresponding call intent score comprises: executing a first iteration of the machine-learning intent model based at least in part on initial audio provided by the caller to generate a first iteration call intent and corresponding first iteration call intent score; determining whether the first iteration call intent score satisfies one or more inquiry criteria; upon determining the first iteration call intent score satisfies one or more inquiry criteria, determining one or more inquiries based at least in part on a knowledge graph stored in a graphical database; presenting an audio output of the one or more inquiries; receiving additional audio in response to the one or more inquiries; executing a second iteration of the machine-learning intent model based at least in part on the additional audio; and iterating the machine-learning model until a generated call intent score satisfies the one or more inquiry criteria.

In various embodiments, executing the call time prediction model additionally comprises executing an empathy analysis model based at least in part on the call intent to determine an empathy time; and wherein executing the first machine-learning model additionally comprises adding the empathy time to the unadjusted time estimate. In various embodiments, the first machine-learning model comprises a different machine-learning model type than the second machine-learning model. In certain embodiments, the first machine-learning model comprises a multiple-linear regression model and a regression tree model, and the second machine-learning model comprises a multiple-linear regression model. In various embodiments, the second-machine learning model is configured to generate time adjustment based at least in part on one or more of: attributes of the customer agent, attributes of the caller, and call center dynamics. Moreover, in certain embodiments, the determined call-time prediction is a first call-time prediction for continuing the call, and wherein the one or more processors are collectively configured to: execute a second-iteration of the call-time prediction model to generate a second call-time prediction for a callback occurring at a defined future time. In various embodiments, the one or more processors are further configured to receive feature enrichment data stored in the one or more memory storage areas, and the call-time prediction model executes the first machine-learning model and the second machine-learning model based at least in part on the feature enrichment data. In various embodiments, receiving audio additionally comprises receiving audio of a virtual assistant representing the caller, and executing the second machine-learning time model comprises determining the time adjustment based at least in part on the customer service agent assigned to the call and an effectiveness quality measure of the virtual assistant.

Certain embodiments are directed to a computer-implemented method comprising: iteratively executing a call-intent determination model, at least in part, by: receiving audio comprising a caller's voice for a call; executing a voice-to-text conversion of the audio to generate transcription data; extracting one or more keywords from the transcription data; executing a machine-learning intent model to determine a call intent and a corresponding call intent score; upon determining that the corresponding call intent score satisfies inquiry criteria, generating an audio output requesting additional audio input from the caller providing additional detail for use as input to the machine-learning intent model; executing a call-time prediction model at least in part by: executing a first machine-learning time model to determine an unadjusted time estimate based at least in part on the call intent; and executing a second machine-learning time model to determine a time adjustment based at least in part on a customer service agent assigned to the call; determining a call-time prediction based at least in part on the unadjusted time estimate and the time adjustment; and generating an audio output providing the call-time prediction to the caller.

In various embodiments, extracting one or more keywords from the transcription data comprises executing a term-frequency, inverse-document frequency (TF-IDF) algorithm to identify keywords within a corpus of historical training data, wherein the historical training data comprises transcription data generated during a plurality of historical calls. In certain embodiments, executing the machine-learning intent model to determine a call intent and a corresponding call intent score comprises: executing a first iteration of the machine-learning intent model based at least in part on initial audio provided by the caller to generate a first iteration call intent and corresponding first iteration call intent score; determining whether the first iteration call intent score satisfies one or more inquiry criteria; upon determining the first iteration call intent score satisfies one or more inquiry criteria, determining one or more inquiries based at least in part on a knowledge graph stored in a graphical database; presenting an audio output of the one or more inquiries; receiving additional audio in response to the one or more inquiries; executing a second iteration of the machine-learning intent model based at least in part on the additional audio; and iterating the machine-learning model until a generated call intent score satisfies the one or more inquiry criteria.

In various embodiments, executing the call time prediction model additionally comprises executing an empathy analysis model based at least in part on the call intent to determine an empathy time; and wherein executing the first machine-learning model additionally comprises adding the empathy time to the unadjusted time estimate. In various embodiments, the first machine-learning model comprises a different machine-learning model type than the second machine-learning model. In certain embodiments, the first machine-learning model comprises a multiple-linear regression model and a regression tree model, and the second machine-learning model comprises a multiple-linear regression model. In various embodiments, the second-machine learning model is configured to generate time adjustment based at least in part on one or more of: attributes of the customer agent, attributes of the caller, and call center dynamics. In certain embodiments, the determined call-time prediction is a first call-time prediction for continuing the call, and wherein the method further comprises: executing a second-iteration of the call-time prediction model to generate a second call-time prediction for a callback occurring at a defined future time. In certain embodiments, the method further comprises: receiving feature enrichment data stored in the one or more memory storage areas, and the call-time prediction model executes the first machine-learning model and the second machine-learning model based at least in part on the feature enrichment data. In various embodiments, receiving audio additionally comprises receiving audio of a virtual assistant representing the caller, and executing the second machine-learning time model comprises determining the time adjustment based at least in part on the customer service agent assigned to the call and an effectiveness quality measure of the virtual assistant.

Certain embodiments are directed to a computer program product for automated call-analysis, the computer program product comprising at least one non-transitory computer-readable storage medium having computer-readable program code portions stored therein, the computer readable program code portions configured to: iteratively execute a call-intent determination model, at least in part, by: receiving audio comprising a caller's voice for a call; executing a voice-to-text conversion of the audio to generate transcription data; extracting one or more keywords from the transcription data; executing a machine-learning intent model to determine a call intent and a corresponding call intent score; upon determining that the corresponding call intent score satisfies inquiry criteria, generating an audio output requesting additional audio input from the caller providing additional detail for use as input to the machine-learning intent model; execute a call-time prediction model at least in part by: executing a first machine-learning time model to determine an unadjusted time estimate based at least in part on the call intent; and executing a second machine-learning time model to determine a time adjustment based at least in part on a customer service agent assigned to the call; determining a call-time prediction based at least in part on the unadjusted time estimate and the time adjustment; and generating an audio output providing the call-time prediction to the caller.

In certain embodiments, extracting one or more keywords from the transcription data comprises executing a term-frequency, inverse-document frequency (TF-IDF) algorithm to identify keywords within a corpus of historical training data, wherein the historical training data comprises transcription data generated during a plurality of historical calls. In various embodiments, executing the machine-learning intent model to determine a call intent and a corresponding call intent score comprises: executing a first iteration of the machine-learning intent model based at least in part on initial audio provided by the caller to generate a first iteration call intent and corresponding first iteration call intent score; determining whether the first iteration call intent score satisfies one or more inquiry criteria; upon determining the first iteration call intent score satisfies one or more inquiry criteria, determining one or more inquiries based at least in part on a knowledge graph stored in a graphical database; presenting an audio output of the one or more inquiries; receiving additional audio in response to the one or more inquiries; executing a second iteration of the machine-learning intent model based at least in part on the additional audio; and iterating the machine-learning model until a generated call intent score satisfies the one or more inquiry criteria.

In various embodiments, executing the call time prediction model additionally comprises executing an empathy analysis model based at least in part on the call intent to determine an empathy time; and wherein executing the first machine-learning model additionally comprises adding the empathy time to the unadjusted time estimate. In various embodiments, the first machine-learning model comprises a different machine-learning model type than the second machine-learning model. Moreover, in certain embodiments, the first machine-learning model comprises a multiple-linear regression model and a regression tree model, and the second machine-learning model comprises a multiple-linear regression model. In certain embodiments, the second-machine learning model is configured to generate time adjustment based at least in part on one or more of: attributes of the customer agent, attributes of the caller, and call center dynamics. In various embodiments, the determined call-time prediction is a first call-time prediction for continuing the call, and wherein the one or more processors are collectively configured to: execute a second-iteration of the call-time prediction model to generate a second call-time prediction for a callback occurring at a defined future time. In various embodiments, the one or more processors are further configured to receive feature enrichment data stored in the one or more memory storage areas, and the call-time prediction model executes the first machine-learning model and the second machine-learning model based at least in part on the feature enrichment data.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
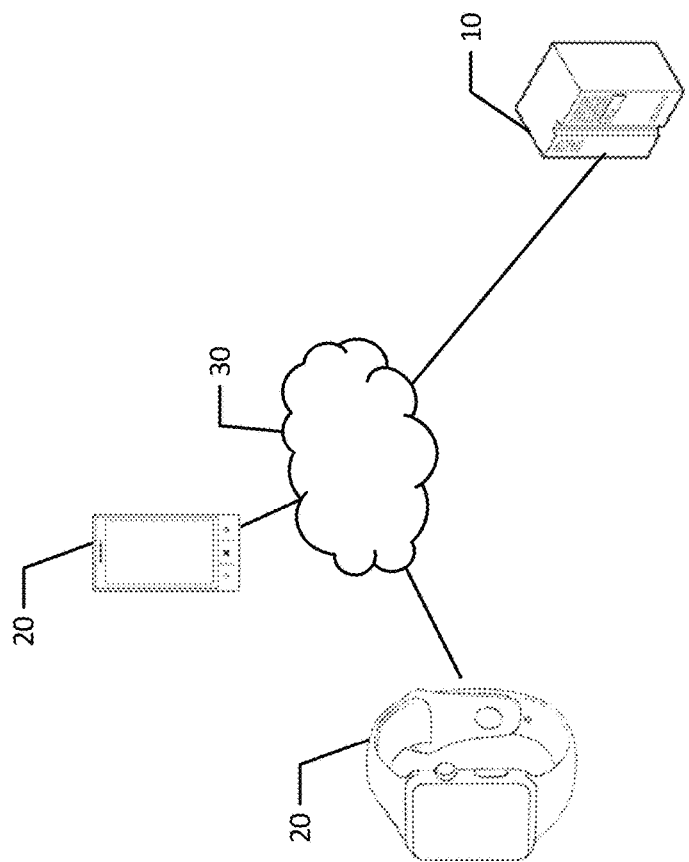
FIG. 1 is an exemplary overview of a system architecture that can be used to practice various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Various embodiments are directed to automated voice-based call-analysis systems implemented via a plurality of machine-learning models for determining a caller's intent when calling into a call center (e.g., a customer-service call center) and for estimating a call-time for completing a customer-service interaction to satisfy the caller's intent. A plurality of machine-learning models are implemented to individually address corresponding attributes of determining a caller's intent, for determining a predicted call duration based on the caller's intent, and for adjusting the predicted call duration to more accurately provide an estimated call-time based at least in part on the customer service agent (e.g., a human or automated system) assigned to address the call. The use of multiple machine-learning models mitigates problems of overfitting models (which may result in inaccurate outputs of a single model) while ensuring that relevant data inputs are considered when generating an estimated call-time for a customer-service interaction.

An iterative inquiry-based methodology is implemented by the system, which receives audio-based input from the caller (e.g., in response to generated audio-output prompts from the system). As the caller vocally provides additional information about the caller's intent (e.g., by answering inquiries), the system extracts keywords from the audio input provided by the caller and inputs these extracted keywords into a call-intent model trained via machine-learning to output intent data indicative of a call intent, as well as a confidence score associated with the intent data. The confidence score may be compared against confidence criteria to determine whether additional information is needed from the caller (e.g., upon determining that an inquiry criteria is satisfied for the confidence score), in which case the system identifies another inquiry to present to the caller (e.g., via an audio output) to obtain additional data from the caller that may be utilized to refine the output of the call-intent model. It should be understood that the predicted call intent may be mapped to a human-informative call intent descriptor (e.g., "to solve a billing issue," "to add a new account"), or the predicted call intent may be limited to a machine-readable data that may be utilized as an intermediate product of the overall system and methodology.

Additional machine-learning models are configured for predicting a call-time for a customer service interaction with the caller. The predicted call-time may include, or may be added to a predicted hold time (which itself may be based at least in part on a predicted call duration for other users already interacting with customer service agents and/or other users that are ahead in queue to speak with a customer-service agent). A first machine-learning model may be utilized to determine an unadjusted predicted call duration for the call, based at least in part on the determined call intent (and/or based at least in part on feature enrichment data extracted from a profile corresponding to the caller). In certain embodiments, the predicted call-time for a call may be based in part on a determination that the caller would likely appreciate some amount of time to be spent with a showing of empathy from the customer service agent (e.g., upon determining that the call relates to medical expenses for a recently deceased family member).

A second machine-learning model may be utilized to generate an adjustment amount of time for the predicted call duration, based at least in part on a customer service agent assigned to the call (e.g., attributes of the customer service agent, such as an accent, a specialty, an average call duration, and/or the like). Certain customer service agents may be well-trained in addressing a particular type of call, and therefore these calls may proceed faster than typical (reflecting a negative time adjustment) with these customer service agents. By extension, other customer service agents may be incapable of efficiently addressing certain caller issues, and therefore these calls may proceed slower than typical (reflecting a positive time adjustment). The overall predicted call duration is then determined by summing the unadjusted predicted call duration with the adjustment amount of time. The system may additionally generate a confidence score to be associated with the overall predicted call duration. If the confidence score satisfies additional inquiry criteria, the system generates one or more inquiries to be presented to the user (e.g., via audio output) to obtain additional data from the caller to more precisely determine a predicted call duration.

Upon generating a predicted call duration that satisfies applicable confidence criteria, the system outputs the predicted call duration to the caller. In certain embodiments, the output may be provided to the caller together with an option to continue the current call or to schedule a call-back at a later time.

Technical Problem

The nature of real-time customer service interactions, such as telephonic customer service interactions and other audio-based customer service interactions results in minimal information being provided to the call center prior to initiation of a customer-service interaction with a caller. Generally, a caller may provide minimal amounts of information regarding the caller's intent during a single, introductory interaction between the caller and an automated system for routing the call to an appropriate customer service agent, however this initial interaction is generally limited to obtaining sufficient information to select an appropriate department for routing the call.

At least in part because of the inherently short-term interaction between a caller and a call center during a telephonic interaction, and the minimal channels of communication available for obtaining additional information from the caller during a call and/or prior to initiating a call, existing systems and methods are incapable of accurately and precisely determining a caller's intent and for predicting the length of a customer service interaction necessary to address the caller's concerns. Both the collection of information necessary to accurately and precisely predict the caller's intent, as well as the processing time necessary to execute methodologies for predicting a caller's intent and a call duration are highly limiting when providing additional information about a telephonic (or other audio-based) customer-service interaction.

Technical Solution

To provide a caller with highly accurate time duration predictions for resolving the caller's intent while operating within the inherent technical limitations of a telephonic or other voice-based customer-service interaction communication protocol, various embodiments encompass a system and corresponding methods for executing a plurality of discrete machine-learning based models for determining a call intent, for determining a predicted call duration, and/or for adjusting the determined predicted call duration based at least in part on attributes specific to the call, such as attributes of a customer service agent assigned to handle the call (which may be indicative of a predicted caller-agent interaction during the call). The plurality of machine-learning based models may comprise a plurality of machine-learning model types (e.g., random forest, multiple regression, linear regression, and/or the like) selected and optimized for providing useful output of the respective model.

Moreover, the described systems and methods utilize an iterative inquiry approach to obtain additional information from a caller to refine the output of each of the plurality of machine-learning based models. For example, after a caller provides information (e.g., via an audio input) providing information about the purpose of the call, the system may extract keywords from the provided input, enrich the input with feature enrichment data received from other data sources (e.g., a profile associated with the caller), and may provide the data as input to the plurality of machine-learning models. Each machine-learning model may output a confidence score to be associated with a primary/substantive output of the model, and the confidence score may be utilized to ensure that only those outputs having a high degree of confidence (e.g., satisfying a confidence criteria such as a confidence score threshold) are utilized for providing the caller with a predicted call duration for the customer service interaction of the call. For each iteration during which the confidence score does not satisfy the applicable confidence score, the system selects/generates a new inquiry to be presented to the caller (e.g., via an audio output) to collect additional information from the caller (e.g., via audio input) that may be added to the previously collected data to further refine the output of the machine-learning models. Those machine-learning models are re-executed with the new input data, and a new confidence score is generated. This process may continue iterating until the generated confidence score satisfies the applicable confidence criteria. In certain embodiments, one or more of the iterative interactions may occur after the caller has been placed in queue to interact with a customer service agent, such that the call is not prolonged by the process of detecting a predicted call duration.

Thus, the described embodiments provide technical solutions for solving the above-mentioned problems while remaining within the technical limitations of data collection during a telephonic or other audio-based customer service interaction.

Computer Program Products, Methods, and Computing Devices

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all non-transitory computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like). A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 provides an example system architecture 100 that can be used in conjunction with various embodiments of the present invention. As shown in FIG. 1, the system architecture 100 may comprise one or more management computing entities 10, one or more user (or caller) computing entities 20, one or more networks 30, and/or the like. Each of the components of the system may be in electronic communication with, for example, one another over the same or different wireless or wired networks 30 including, for example, a wired or wireless Personal Area Network (PAN), Local Area Network (LAN), Metropolitan Area Network (MAN), Wide Area Network (WAN), and/or the like. Additionally, while FIG. 1 illustrates certain system devices as separate, standalone devices, the various embodiments are not limited to this particular architecture.

Exemplary Management Computing Entity

Figure 2:
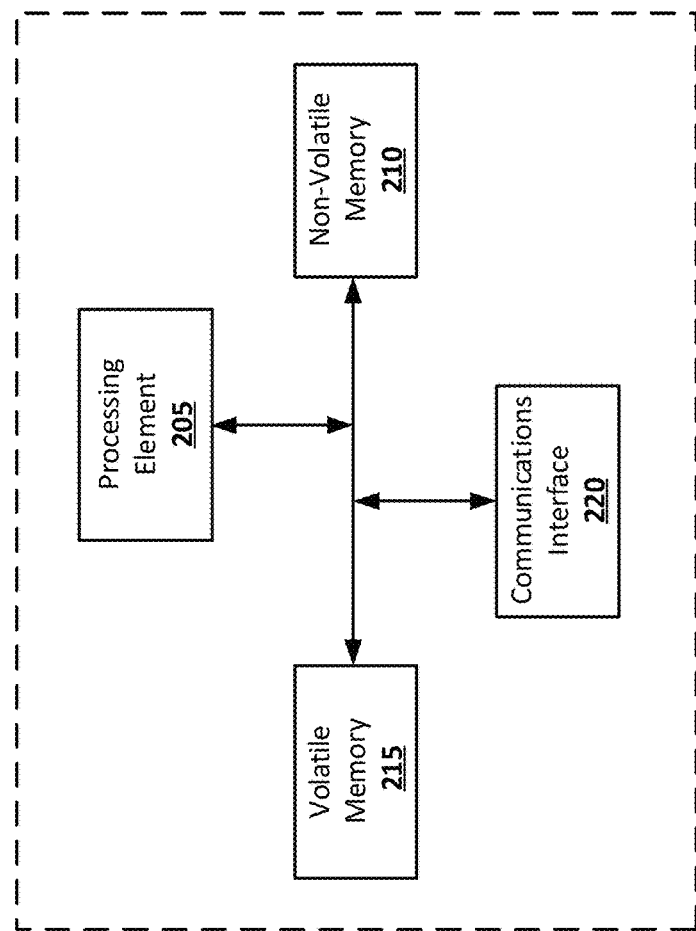
FIG. 2 is an example schematic of a management computing entity in accordance with certain embodiments.

FIG. 2 provides a schematic of a management computing entity 10 according to one embodiment of the present invention. In general, the terms computing device, entity, device, system, and/or similar words used herein interchangeably may refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes may include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 10 may also include one or more network and/or communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the management computing entity 10 may include or be in communication with one or more processing elements 205 (also referred to as processors, processing circuitry, and/or similar terms used herein interchangeably) that communicate with other elements within the management computing entity 10 via a bus, for example. As will be understood, the processing element 205 may be embodied in a number of different ways. For example, the processing element 205 may be embodied as one or more complex programmable logic devices (CPLDs), microprocessors, multi-core processors, coprocessing devices, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the management computing entity 10 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the management computing entity 10 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the management computing entity 10 with the assistance of the processing element 205 and the operating system.

As indicated, in one embodiment, the management computing entity 10 may also include one or more network and/or communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 10 may be configured to communicate via wireless external communication networks using any of a variety of protocols, such as general packet radio service (GPRS), Universal Mobile Telecommunications System (UMTS), Code Division Multiple Access 200 (CDMA200), CDMA200 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The management computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the management computing entity's components may be located remotely from other management computing entity 10 components, such as in a distributed system. Furthermore, one or more of the components may be aggregated and additional components performing functions described herein may be included in the management computing entity 10. Thus, the management computing entity 10 can be adapted to accommodate a variety of needs and circumstances, such as including various components described with regard to a mobile application executing on the user computing entity 20, including various input/output interfaces.

Exemplary User Computing Entity

Figure 3:
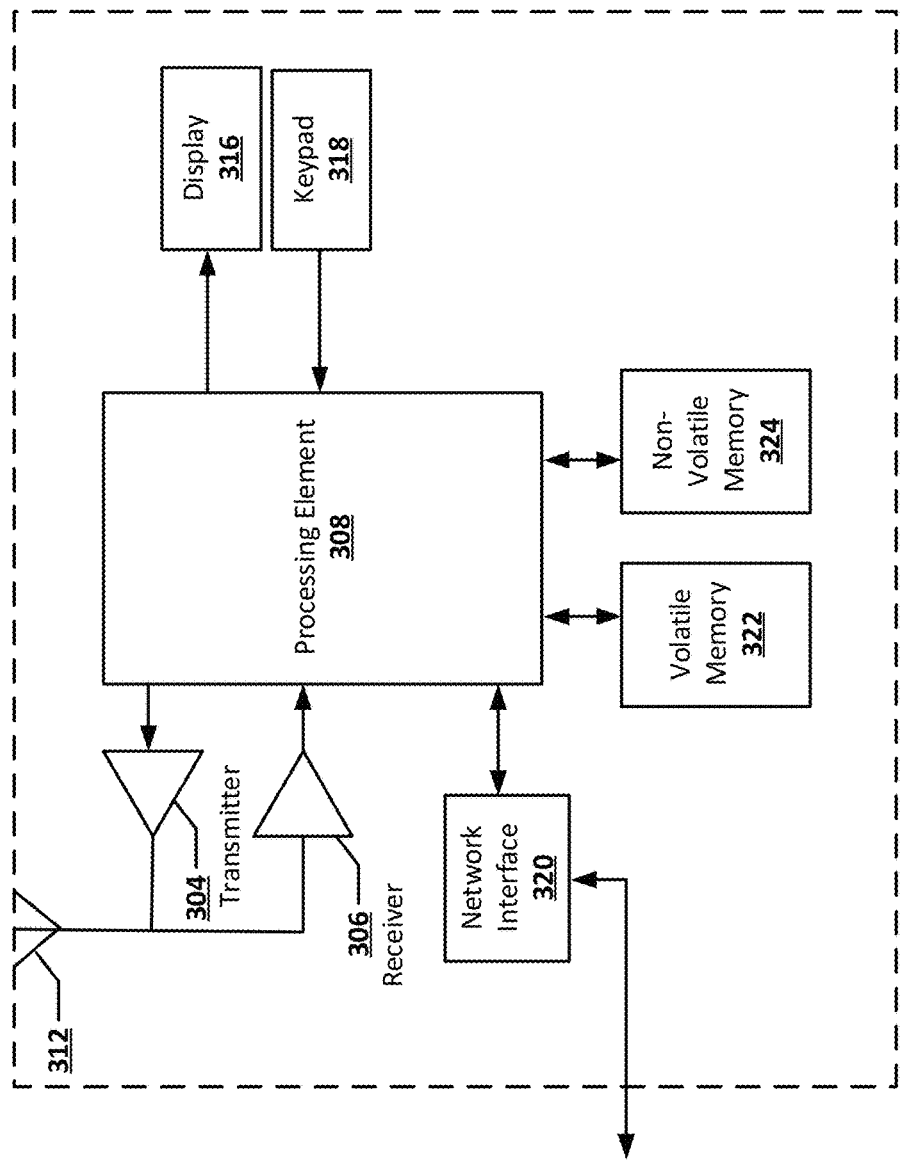
FIG. 3 is an example schematic of a user computing entity in accordance with certain embodiments.

FIG. 3 provides an illustrative schematic representative of user computing entity 20 that can be used in conjunction with embodiments of the present invention. In various embodiments, the user computing entity 20 may be or comprise one or more mobile devices, wearable computing devices, and/or the like. The user computing entity 20 according to certain embodiments enables the user (referred to alternatively as a caller) to telephonically interact with the management computing entity 10 and/or to otherwise establish an audio-based communication-channel with the management computing entity 10 and/or with a customer service agent associated with the management computing entity 10.

As shown in FIG. 3, a user computing entity 20 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various devices, such as a management computing entity 10, another user computing entity 20, and/or the like. In an example embodiment, the transmitter 304 and/or receiver 306 are configured to communicate via one or more SRC protocols. For example, the transmitter 304 and/or receiver 306 may be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna 312, transmitter 304, and receiver 306 may be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like. The user computing entity 20 may also include one or more network and/or communications interfaces 320 for communicating with various computing entities, such as by communicating data, content, information, and/or similar terms used herein interchangeably that can be transmitted, received, operated on, processed, displayed, stored, and/or the like.

In this regard, the user computing entity 20 may be capable of operating with one or more air interface standards, communication protocols, modulation types, and access types. More particularly, the user computing entity 20 may operate in accordance with any of a number of wireless communication standards and protocols. In a particular embodiment, the user computing entity 20 may operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 20 can communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 20 can also download changes, add-ons, and updates, for instance, to its firmware, software (e.g., including executable instructions, applications, program modules), and operating system.

According to one embodiment, the user computing entity 20 may include location determining aspects, devices, modules, functionalities, and/or similar words used herein interchangeably to acquire location information/data regularly, continuously, or in response to certain triggers. For example, the user computing entity 20 may include outdoor positioning aspects, such as a location module adapted to acquire, for example, latitude, longitude, altitude, geocode, course, direction, heading, speed, UTC, date, and/or various other information/data. In one embodiment, the location module can acquire information/data, sometimes known as ephemeris information/data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the apparatus's 30 position in connection with a variety of other systems, including cellular towers, Wi-Fi access points, and/or the like. Similarly, the user computing entity 20 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing entities (e.g., smartphones, laptops) and/or the like. For instance, such technologies may include iBeacons, Gimbal proximity beacons, BLE transmitters, NFC transmitters, and/or the like. These indoor positioning aspects can be used in a variety of settings to determine the location of someone or something to within inches or centimeters.

The user computing entity 20 may also comprise a user interface device comprising one or more user input/output interfaces (e.g., a display 316 and/or speaker/speaker driver coupled to a processing element 308 and a touch interface, keyboard, mouse, and/or microphone coupled to a processing element 308). For example, the user interface may be configured to provide a mobile application, browser, interactive user interface, dashboard, webpage, and/or similar words used herein interchangeably executing on and/or accessible via the user computing entity 20 to cause display or audible presentation of information/data and for user interaction therewith via one or more user input interfaces. Moreover, the user interface can comprise or be in communication with any of a number of devices allowing the user computing entity 20 to receive information/data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 20 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 20 can capture, collect, store information/data, user interaction/input, and/or the like.

The user computing entity 20 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the user computing entity 20.

Exemplary Networks

In one embodiment, any two or more of the illustrative components of the system architecture 100 of FIG. 1 may be configured to communicate with one another via one or more networks 30. The networks 30 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 30 may have any suitable communication range associated therewith and may include, for example, global networks (e.g., the Internet), MANs, WANs, LANs, or PANs. In addition, the networks 30 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Example System Operation

The methodology of an example automated voice-based call-analysis system is described in reference to FIGS. 4-11.

Figure 4:
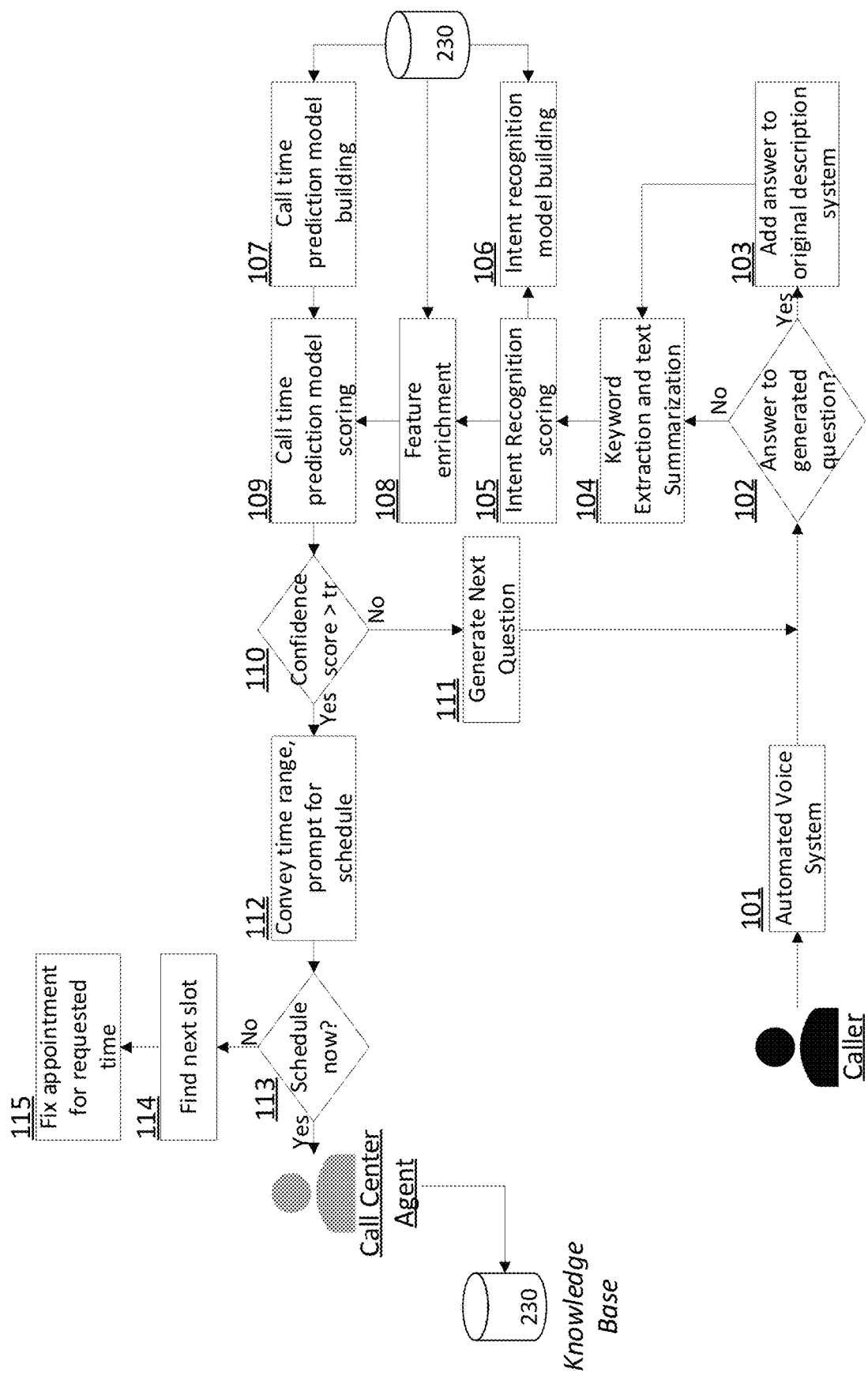
FIG. 4 is a flowchart illustrating various methodologies executed during a real-time interaction between a caller and a call center according to certain embodiments.

As a high-level summary with reference to FIG. 4, the process begins when a caller calls a customer service center (e.g., via a telephonic phone connection, via an audio-based real-time communication connection, and/or the like) of an organization. An automated voice system (illustrated at Block 101) executed by the management computing entity 10 prompts the caller with a welcome message and asks the caller to speak a description of the caller's issue (e.g., by stating a welcome message such as "How can I help you today?"). The management computing entity 10 converts the audio of the caller's response into text. The management computing entity 10 determines whether the caller is answering a generated inquiry (discussed later), as indicated at Block 102. If the caller is not answering a generated inquiry and is instead providing a general issue description, the management computing entity 10 extracts keywords from the caller's text (e.g., through term-frequency, inverse document frequency (TF-IDF) processes for identifying keywords, and/or the like), as indicated at Block 104. A summary may also be generated (e.g., the summary need not be human-understandable, and may be reflected by a series of keywords without grammatical connection). If the user is answering an inquiry posed by the management computing entity 10, the answer is added to the original description and the answer is then analyzed to extract keywords and to summarize the answer, as indicated at Blocks 103-104.

The caller's intent is then predicted, as indicated at Block 105 via an intent recognition model. As discussed herein, the intent recognition model may generate a prediction of the caller's intent together with a confidence score to be associated with the determined caller's intent. If the confidence score does not satisfy confidence criteria, the process may iterate through Blocks 110-111, 102-105, and 108-109 until the confidence score associated with the predicted intent (referred to as an intent confidence score herein) satisfies the confidence criteria for the caller's intent prediction. The intent recognition model is trained via machine-learning utilizing historical data, and the intent recognition model is periodically updated to reflect newly generated data (e.g., from newly received calls), as reflected at Block 106, with reference to a knowledge base 230 storing data regarding historically received calls.

As indicated at Block 108, the data is further enriched with feature enrichment data relevant to the particular call, such as user data (e.g., data indicative of attributes of the caller, as stored and accessible via the knowledge base 230, such as in a user profile), user demographics, issue details, and/or the like. This feature enrichment data is added with the determined caller intent and/or the extracted keywords and the text summary. In other embodiments, the feature enrichment data may also be utilized as input for the intent recognition model (e.g., for domain identification, to identify additional relevant data associated with concepts discussed by the caller, and/or the like).

The management computing entity 10 then generates a predicated call duration for the call, as reflected at Block 109, utilizing one or more machine-learning based models constructed utilizing data stored in the knowledge base 230, as indicated at Block 107. The training data comprises past queries, service times, user information, issue information utilized to identify similar users' service times for similar queries and to predict the call service time for the issue. The predicted call duration may be generated by first generating an unadjusted predicted call duration via a first machine-learning model, and the unadjusted predicted call duration may then be adjusted by the output of a second machine-learning model providing an adjustment time that provides an adjustment to the unadjusted predicted call duration based at least in part on user-agent compatibility (e.g., by considering data identifying attributes of the customer service agent) and call center dynamics.

The output of the machine-learning models, including the overall predicted call duration is output together with a confidence score for the call duration prediction (referred to herein as the call duration confidence score). The management computing entity 10 determines whether the confidence score satisfies confidence criteria for the predicted call duration, as indicated at Block 110. If the intent recognition model and/or the call duration prediction model are incapable of satisfying applicable confidence criteria, the management computing entity 10 generates and/or selects an additional inquiry (embodied as a single question or a series of questions) to present to the user (e.g., via an audio-based output) as indicated at Block 111 to elicit additional detail from the caller to assist in more accurately predicting the caller's intent. These inquiries may be stored in one or more knowledge graphs, and may be selected from the knowledge graph for presentation to the caller based at least in part on the already-presented information received from the caller. As mentioned above, the caller's answers are captured and added to the original description presented by the caller, as indicated at Block 103. The process of Blocks 102-111 repeats until the confidence scores for the predicted call duration and/or the intent recognition models satisfy applicable confidence criteria as determined at Block 110.

Once the confidence scores satisfy applicable confidence criteria, the predicted call duration is conveyed to the caller (e.g., via an audio-based output), as indicated at Block 112. The predicted call duration may be conveyed together with an option for the caller to continue the current call, to call back at a later time, and/or to schedule a later call-back. If the caller's schedule is made available to the management computing entity 10 (e.g., by the user computing entity 20 providing the schedule to the management computing entity 10, by the user granting access to an external calendaring application to provide the caller's schedule to the management computing entity 10, and/or the like), the management computing entity 10 may select an available timeframe within the caller's schedule that fits the predicted call duration, as indicated at Blocks 113-115.

Caller Connection Methodologies and Historical Data Identification

The systems and methods discussed herein are described in reference to facilitating an audio-based communication between a user (caller) and an entity operating a management computing entity 10. The management computing entity 10 provides an automated, audio-based interactive interface for callers to provide functionality such as identifying a predicted call intent (e.g., at least in part via extraction of keywords from audio-based data provided by the caller, by providing feature-enrichment functionality to the extracted audio-based data provided by the caller, by executing a call intent machine-learning based model, and/or the like), predicting a call duration (e.g., at least in part via execution of one or more machine-learning call duration models), presenting audio-based inquiries to the caller to facilitate the collection of additional information about the call, and/or the like.

Accordingly, the systems and methods according to certain embodiments are configured for connecting with a user computing entity to establish an audio-based communication channel with the user computing entity. For example, the caller may utilize the user computing entity 20 as a telephone to connect and establish a telephonic communication channel with the management computing entity 10. As yet another example, the caller may utilize the user computing entity 20 as a computing device executing an "app" (or other computer program) that facilitates connection (e.g., via the internet) with the management computing entity 10 to establish an audio-based communication channel. Although this application is described specifically in reference to telephonic and other audio-based communication channels, it should be understood that the features and configurations discussed herein may be implemented in other real-time communication channels, such as textual chat communication channels. It should be understood that any of a variety of two-way communication protocols may be utilized, including JSON, REST, SOAP, and/or the like.

Moreover, the user (caller) need not communicate directly with the management computing entity 10. For example, the user computing entity 20 of certain embodiments is implemented as a virtual assistant (e.g., Google Home, Alexa, Siri, and/or the like) configured to collect audio-based information from a user, and to communicate relevant data to the management computing entity 10 (e.g., via computer-readable data that may or may not encompass audio). As discussed herein, the management computing entity 10 may be configured to identify those communication instances in which the caller is communicating with the management computing entity 10 via a virtual assistant and one or more models may be adjusted, such as to compensate for potentially erroneous conveyances of information collected by the virtual assistant (e.g., resulting from an inaccurate transcription of voice-to-text). As just one example, a lower confidence score threshold may be implemented prior to conveying data regarding a predicted call duration.

In certain embodiments, the features and/or functionality discussed herein are implemented as a part of an automated call-routing functionality of the management computing entity 10. For example, a caller may first be connected with an automated voice system for receipt of user input (e.g., voice-based input, touch-tone input, and/or the like) for routing the call to a particular department within a call center. Additional functionality as discussed herein may be performed simultaneously and/or after routing the call to a particular department, such as determining a predicted call intent and/or predicting a call duration. Data collected via the automated audio-based interface may be presented (e.g., graphically, via a graphical display) to a customer service agent who assists the caller once the caller is connected with the customer service agent. In other embodiments, such as where the customer service agent is an automated system, the data collected by the management computing entity 10 may be utilized to facilitate and/or otherwise provide data to the automated customer service agent to begin providing a solution to the caller.

Thus, communications between the caller and the management computing entity 10 may proceed prior to the caller being connected with a customer service agent. The caller may be provided with an option to obtain additional information about a predicted call duration to resolve the caller's problem (e.g., after the caller has provided an initial description of the problem). The predicted call duration may be calculated from the moment the predicted call duration is generated until the moment a customer service agent completes the task for assisting the caller. Thus, if the caller is on hold, the predicted call duration encompasses the remaining predicted hold time as well as the predicted amount of time needed for the customer service agent to resolve the caller's issues. The caller may then be given the option to continue the call or to call back at a later time.

As another example, the communications between the caller and the management computing entity 10 may occur while the caller is connected with a customer service agent. The interactions between the caller and the customer service agent, such as interactions during which the caller describes the purpose of the call, may be simultaneously provided to the management computing entity 10 as input to the models described herein for determining a predicted call duration. The management computing entity 10 may then provide the caller with an audio output (while the caller is talking with the customer service agent) indicating the predicted call duration for the customer service agent to address the caller's concerns.

As another example, the communications between the caller and the management computing entity 10 may be utilized for both estimating a predicted call duration and for determining a customer service agent best suited for addressing the caller's problems. Thus, the interactions between the caller and the management computing entity 10 may occur prior to the caller being connected with a customer service agent, or the interactions between the caller and the management computing entity 10 may occur after the caller is connected with an initial customer service agent, but before the caller is transferred to a more experienced customer service agent who can help with the exact issue of the caller. After collecting initial data from the caller, the management computing entity 10 provides the caller with a predicted call duration for resolving the call (e.g., with the currently connected customer service agent and/or with a more experienced customer service agent who may be available at a later time). The caller may then be provided with an option to continue the current call with the currently available customer service agent or to schedule a later call back when the more experienced customer service agent is available.

As discussed in greater detail herein, the various machine-learning models are trained via historical data, and certain call-specific data is enriched using historical data and/or caller-specific data retrieved from user-profiles stored within a knowledge base 230. The knowledge base 230 comprises an enriched data repository storing the operational data utilized by the call center. The various machine-learning models (e.g., the call intent prediction model and the call duration prediction models) utilize the data stored within the knowledge base 230 for model construction and for feature enrichment input to the model.

Figure 5:
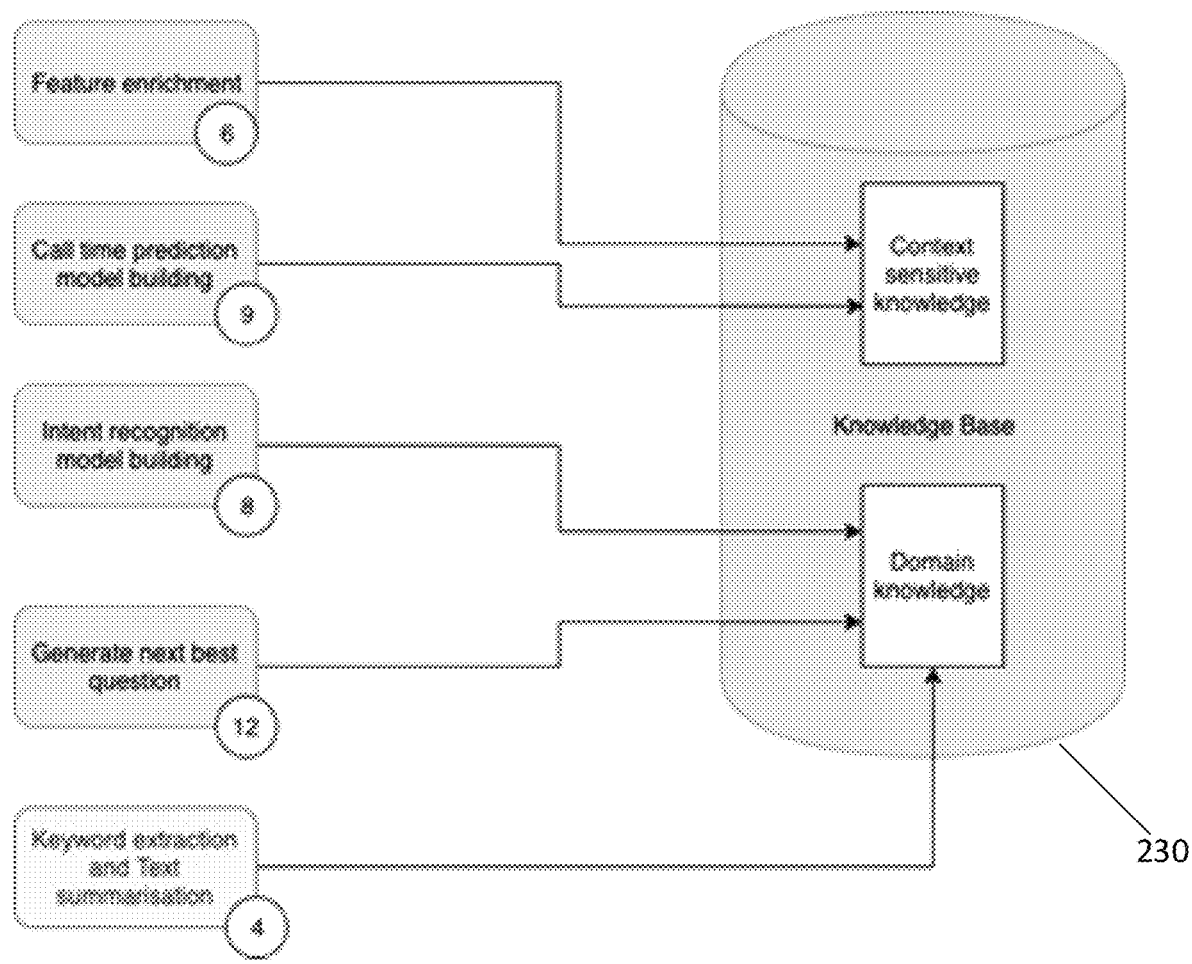
FIG. 5 is a schematic illustrating certain data types stored within a knowledge base according to certain embodiments.

Example contents of a knowledge base are illustrated in FIG. 5, which indicates that data stored therein may be indicated as content-specific knowledge or domain-knowledge. Content-sensitive knowledge comprises data that may be utilized for feature enrichment and/or model training. Such content-sensitive knowledge may comprise user profiles that may contain user-specific data such as identifying data (e.g., a name, a unique identifier, and/or the like of a user), health-specific data (e.g., age, height, weight, existing medical conditions, existing medications, recently received medical services, and/or the like), membership data (e.g., a user's health insurance provider, a user's health insurance plan, a user's connection with other members (e.g., family members, such as a spouse), and/or the like. Data utilized for model building may comprise data and/or metadata generated during historical calls. Such historical data may comprise audio-data, keywords, summaries, a predicted call duration, a predicted call intent, an actual call duration, the identity of the caller, the identity of the customer service agent, and/or the like.

The domain knowledge stored in the knowledge base comprises knowledge graphs of various inquiries/questions to be presented to callers in the event relevant confidence criteria are not satisfied for a call intent prediction and/or a call duration prediction. Moreover, the domain knowledge comprises historical data utilized to train a model for extraction of keywords and/or for generation of text summaries for calls.

The knowledge base 230 is implemented via the management computing entity 10, which interacts with the caller via an automated voice system providing audio outputs to the caller and receiving audio inputs of the caller's voice as inputs. The automated voice system is configured for capturing a caller's voice-based inputs, and therefore the automated voice system includes functionalities for ensuring that the caller has completed providing input before ending an input capture period. For example, the automated voice system is configured to identify a period of silence of a defined length (e.g., 5 seconds), with silence being identified as a period of captured audio without the caller's voice therein. Moreover, the automated voice system is configured to provide an intimation to the caller that the call duration prediction mechanism is occurring (e.g., a periodic beep, background tones, and/or the like), and the system is configured to end the call duration prediction mechanism by presenting an indication of a predicted call duration once the call duration prediction satisfies applicable confidence criteria.

Any of a variety of methodologies may be utilized for capturing audio input from the caller. For example, the automated voice system may be configured to filter background noises automatically (e.g., noises with a defined frequency, noises identified as being not related to a caller's voice, and/or the like), the automated voice system may additionally be configured to capture only a single description of an issue/problem at a time, and multiple issues/problems of the caller should be addressed sequentially (however certain embodiments are configured to process multiple issues/problems simultaneously, and may be configured to determine a comprehensive call duration prediction for addressing all of the caller's issues/problems). Moreover, to assist in identifying keywords spoken by a caller, the automated voice system is configured to ignore or otherwise remove filler words and/or non-contextual speech (e.g., prepositions, superfluous adjectives, non-substantive words, and/or the like). However, certain embodiments are configured for providing an evaluation of a level of empathy to be provided to a caller, and such embodiments may be configured to utilize superfluous modifier words to determine a sentiment of the caller, which may be utilized to determine the necessity of additional consolation or empathy time to be spent by the customer service agent while addressing the caller's issues/problems. Similarly, the automated voice system is configured for assigning a sentiment to input received from the caller, such as a positive sentiment, a negative sentiment, or a neutral sentiment. The sentiments may be determined based at least in part on words used, tone used, and/or the like.

Determinations of an appropriate level of empathy to be provided to a caller may be determined based at least in part on historical data. In certain embodiments, a discrete empathy analysis model may be utilized to analyze historical data indicative of call history (e.g., together with data provided by callers through a satisfaction survey at the end of a plurality of historical calls). The discrete empathy analysis model may be configured to categorize a level of empathy provided to a caller during a call (e.g., based at least in part on identifying tone of the customer service agent, identifying one or more keywords identified as empathy keywords, and/or the like). The discrete empathy analysis model may additionally receive an indication of a predicted call intent for each of the historical calls as input, such that the level of empathy provided may be stored together with an indication of a call intent, and the data provided by the caller indicating a satisfaction with the call (e.g., provided in response to a caller survey at the end of the call). The discrete empathy analysis model determines, based at least in part on the provided input data, an appropriate level of empathy to be provided for various predicted call intents. It should be understood that more granular indications of an appropriate level of empathy may be provided (e.g., based on characteristics of the user profile associated with the caller). Indications of an appropriate level of empathy to be provided to the caller may be factored into the first machine-learning model as an amount of time to be spent by a customer service agent providing empathetic communications with the caller, such as providing consoling words and/or words of encouragement if the caller is likely to benefit from empathetic communications.

As discussed in reference to Blocks 102-103 of FIG. 4, the automated voice system functionality of the management computing entity 10 is configured to determine whether a particular audio input (e.g., voice input from the caller) is an answer to a particular inquiry generated by the management computing entity 10 (e.g., an inquiry generated in accordance with the functionality reflected at Block 111 of FIG. 4) to understand the intent of the caller or to understand the complexity of the caller's issue. If this check determines that the audio input reflects an answer to a generated inquiry, the data reflecting the audio input is added to previously generated data regarding the call, as reflected at Block 103. For example, if the caller has called the customer service center to discuss a denied medical claim because of a prior authorization issue, an inquiry asked by the management computing entity 10 (in accordance with the functionality of Block 111) may be "Do you already have a prior authorization number with you?" and the caller answers "yes." This response would be added to existing data, such as data reflecting the caller's original problem description (e.g., "Hi I am Christine Meadows, I need details of the claim that's denied because of 'no prior authorization'"). The newly received data may be concatenated to include a statement "I have a prior authorization number with me" to reflect the newly received data. This configuration enables more detail to be added to data that may be utilized to understand the complexity of a caller's issue. Moreover, the management computing entity is configured to convert the caller's response into a complete, human-understandable sentence as inferred above when adding the response to the existing data, to add context to the caller's response.

To the extent that the management computing entity 10 is incapable of determining a caller's intent and/or to determine a predicted call duration, the management computing entity 10 is configured to provide an indication to the caller that the caller's intent cannot be accurately determined and/or that a call-time cannot be accurately predicted.

Caller Interactions

The call intent determination is based at least in part on extracted keywords and/or generated summaries of audio-data provided by a caller. As discussed above, the management computing entity 10 (via the automated voice system 101 illustrated in FIG. 4) is configured for transcribing the audio-input provided by the caller to generate a textual representation of the information provided by the caller. Features for extracting keywords and for generating summaries may be performed using natural language processing (NLP) to parse transcribed text, extract keywords from the transcribed text, enrich the transcribed data with data obtained from other data sources, and to store the transcribed data in the knowledge base for processing.

The keyword extraction and text summarization features reflected at Block 104 of FIG. 4 provide keyword extraction, domain dictionary (e.g., word substitution that consolidates and/or translates the language to a particular set of known terms based at least in part on a feedback loop and/or training of an appropriate model, utilizing a sufficiently large corpus of relevant words used in the domain), model operations (e.g., any operational activity utilized in creating models, scoring the model output, and/or utilizing algorithms for generating model outputs), and/or the like. All audio-based interactions between the caller and the management computing entity 10 are performed via the keyword extraction and text summarization features to provide relevant transcribed data for execution of other functionalities of the described system. Moreover, the domain dictionary translates the conversation to a canonical form comprising technical and unambiguous words used in the domain, that facilitate efficient functionality of various features as discussed herein.

The keyword extraction and text summarization features utilize domain knowledge for execution. Interactions in call centers of an organization are generally domain specific and involve intricate questions with lexemes that are specifically relevant to a particular domain. Understanding such lexemes and annotating them appropriately (or otherwise converting the lexemes into non-domain-specific summaries) for downstream scoring purposes ensures high levels of accuracy in predicting a call intent and ultimately predicting a call duration. Keywords extracted and included within a summary of a call intent are domain-agnostic and do not involve compound terminology or qualifiers that are specific to a given domain. The keyword extraction and text summarization functionality defines an abstract semantic representational language at a domain level that can transform or map a specific set of keywords to a domain equivalent.

Moreover, the keyword extraction and text summarization features of the management computing entity 10 utilize context sensitive data stored within the knowledge base 230, which may be acquired from past queries by a caller or from a third party organization relevant to a particular caller.

Extraction of keywords begins by first transcribing the audio-based input provided by a caller to generate a textual representation of the audio-based input. Transcription of the audio-data is executed by the management computing entity 10 automatically and in real-time as audio data is received from the caller. The transcribed text is then preprocessed by cleaning the text to remove fillers, performing basic text preprocessing and later extracting keywords using term-frequency, inverse document frequency (TF-IDF) processes. In terms of use of TF-IDF processes in the present implementation, the term "document" refers to a caller interaction with the management computing entity 10. Text preprocessing in certain embodiments comprises removing redundant text components (de-duplication), stemming, and/or lemmatization. De-duplication is performed to remove duplicate words that hinder the efficiency of certain processing tasks. Stop words may be removed from the text before training a deep-learning based machine-learning model because stop words are generally sufficiently abundant to provide little or no unique information that can be utilized for classification and/or clustering. Stemming and lemmatization are performed to the text to extract only a base/root word within the text, so as to enable a comparison across multiple interactions to identify the relevance of particular keywords.

The management computing entity 10 creates a vocabulary listing from the pre-processed text and returns a term-document matrix. Each column in the matrix represents a word (or phrase) in the vocabulary while each row represents the document in the dataset, and each cell within the matrix reflects a word count of the particular word of the column within the document of the row relating to the cell. This matrix is utilized to perform TF-IDF analysis, utilizing a large data corpus so as to ascertain the inverse document frequency of the use of a particular word, thereby enabling the management computing entity 10 to identify the relevance of particular keywords for each of a plurality of documents/transcribed call interactions.

Computation of the TF-IDF generates an identification of top keywords within each document. Based at least in part on the TF-IDF scores, the management computing entity 10 extracts words with the highest scores to identify the keywords for a particular document (or in this case, for a particular transcribed interaction between the caller and the management computing entity 10). The top keywords for a given document are sorted in descending order of importance and a defined number (e.g., the top "n" keywords) of keywords are assigned as relevant keywords for a particular call. Those keywords are then stored in the knowledge base in association with additional data relevant for the call, and/or the keywords are utilized as input (e.g., together with other data that may be utilized as input) to the call intent prediction model.

Text summarization provides additional data that may be utilized as input to the call intent prediction model. Text summarization processes begin with text cleaning to remove fillers from the transcribed text describing the caller's issue/query before the process moves to sentence tokenization processes for splitting the text transcription describing each issue/query into a list of sentences to be utilized as tokens.

The text summarization process then proceeds to skip thought encoding for generating fixed length vector representations for each tokenized sentence in the issue/query. These representations encode the inherent semantics and meaning of the corresponding sentence, such as using Skip-Gram Word2Vec methodologies (although other skip thought encoding methodologies may be utilized) for generating word embeddings to provide word embeddings for individual words that are present within the model vocabulary discussed above.

Sentence embeddings may be generated according to certain embodiments by generating a weighted sum of the word vectors for the words contained in the sentence (using weights to discount the importance of frequently used words that do not provide any relevant information about the sentence). Rarely occurring words are weighted more heavily, as these words provide higher context for the sentence. Accordingly, words are weighted inversely relative their relative usage.

Training of models for generating text summaries may be performed utilizing unsupervised training methodologies that do not consider the sequence order of words utilized within a sentence, or training may be performed utilizing a supervised training methodology that considers the sequence order of word usage. For example, skip thought modelling methodologies proceed in accordance with two processes: encoding and decoding.

Skip thought encoding may be performed in accordance with a neural network (e.g., a gated recurring unit, recurrent neural network (GRU-RNN)) for generating a fixed length vector representation h(i) for each sentence S(i) in the input. The encoded representation h(i) is obtained by passing final hidden states (e.g., of the GRU cell, after it has reviewed the entire sentence) to multiple dense layers. Decoding then proceeds by intaking the encoded representation h(i) and generates two sentences—S(i−1) and S(i+1), which could occur before and after the input sentence, respectively. Separate decoders are implemented for generation of previous and next sentences, both utilizing GRU-RNNs. The vector representation h(i) acts as an initial hidden state for the GRUs of the decoder networks.

Given a dataset containing a sequence of sentences, the decoder generates the predicted previous and next sentences on a word-by-word basis. The encoder-decoder network is trained to minimize the sentence reconstruction loss, and in doing so, the encoder learns to generate vector representations that encode sufficient information for the decoder to enable the decoder to generate neighboring sentences. These learned representations are such that embeddings of semantically similar sentences are closer to each other in the vector space, and therefore are suitable for clustering. The sentences in a caller query are provided as input to the encoder network to obtain the desired vector representations.

The text summarization methodology proceeds to clustering processes. After generation of the sentence embeddings for each sentence in a user query, these embeddings are clustered in a high-dimensional vector space into a pre-defined number of clusters. The number of clusters is equal to the desired number of sentences within a summary.

To conclude the text summarization process, each cluster of sentence embeddings is interpreted as a set of semantically similar sentences having a meaning expressed by a single candidate sentence within the summary. The candidate sentence is chosen to be the sentence having a vector representation closest to the cluster center. Candidate sentences corresponding to each cluster are then ordered to form a summary for the caller's query.

After identification of keywords and text summaries for a caller's interaction with the call, the resulting text reflective of the keywords and text summaries are stored (e.g., temporarily) such that the resulting text may be provided as a part of input provided to the call intent recognition model, the predicted call duration models, and/or the like. The generated text of the keyword generation and summary generation processes may be stored together with the original text transcription provided from the caller, as well as additional metadata and/or other contextual data that may be provided with the call. For example, a call time, a caller phone number (or other source identifier, such as an IP address, a user account identifier, and/or the like for those calls originating via an internet-based two-way communication channel), and/or the like. As discussed in greater detail herein, the data stored for a particular call may be utilized to retrieve additional data during feature enrichment processes as discussed herein, such as by utilizing certain data elements stored for a particular call to query the knowledge base to retrieve additional data to be added as feature enrichment for the machine-learning based models discussed herein.

Automated Call Intent Recognition and Feature Enrichment

As mentioned above, the management computing entity 10 executes a model for predicting a call intent (as reflected at Block 105 of FIG. 4), utilizing the keywords extracted from the caller-provided input and the text summarization generated in accordance with the methodologies discussed above. The intent recognition model utilizes a machine-learning model, trained via data stored in the knowledge base 230 to utilize the keywords and the generated text summary to generate an indication of a call intent and a intent confidence score assigned to the call intent. As additional data is added to the corpus of call-specific data (e.g., as a result of the caller supplementing the data with answers to presented inquiries during iteration of the process discussed in reference to FIG. 4), the confidence score associated with a generated call intent prediction may increase, until the confidence score satisfies applicable confidence criteria indicating the predicted call intent has a sufficient level of confidence to be utilized for downstream processes, such as generating a call duration prediction.

The call intent prediction model may utilize supervised learning or unsupervised learning (e.g., based at least in part on data generated during a later interaction with a customer service agent to confirm whether a predicted call intent was accurate or inaccurate), and the call intent prediction model may be periodically trained using training data embodied as historical data from previous call interactions between various callers and the call center to determine relevant correlations between the keywords and textual summaries and a determined call intent.

The call intent provides a relevant datapoint for determining a predicted call duration, however the management computing entity 10 is configured to further enrich this data with reference to other accessible and relevant data for the call. Data provided for feature enrichment comprises data indicative of the mode of communication utilized between the caller and the management computing entity 10, such as whether the caller is communicating via a virtual assistant (in which case the caller is not directly in communication with the management computing entity 10), via an app that provides internet-based, real-time audio communication that additionally enables other modes of simultaneous communication of other data, via a telephone call, and/or the like. As an example, in instances in which a virtual agent is utilized to initiate a call, a model for determining a caller intent may weight various data differently to account for the efficacy of the virtual agent in speech recognition.

When a virtual assistant is representing the caller, the traits specific to the human caller such as demographics, accent, occupation, communication effectiveness may be ignored by the model. The model instead utilizes available technical details of the virtual assistant to determine its communication effectiveness with an agent. As an example, the virtual assistant may employ a speech recognition model with an effectiveness quality as measured based at least in part on the training corpus, Word Recognition Rate (WRR) and/or Word Error Rate (WER). The quality of speech recognition of the virtual agent will impact the overall conversation time between the virtual agent representing the caller and the call center agent. Moreover, the effectiveness of use of a virtual assistant may be based at least in part on an understanding that a virtual assistant is capable of searching publicly available data sources (e.g., using a typical internet-based keyword search) for various healthcare-specific text, words, or phrases, and therefore a virtual assistant can, in certain instances, have increased effectiveness in communicating with an agent. Moreover, a virtual agent may have access to a particular patient's health record, and therefore the management computing entity 10 need not specifically mention attributes of the patient's heath record, to the extent those details are accessible by the virtual agent.

To accurately predict a call intent and/or to accurately predict a call duration, additional data beyond the keywords and text summary may be provided as input to the one or more models. This additional data is provided via feature enrichment methodologies, for example, after an initial call intent is determined via call intent recognition methodologies. For example, identifying data of the caller, such as the caller's name, age, gender, occupation, accent/dialect, race, ethnicity, education, association with the medical industry, and/or the like may be retrieved from a database (e.g., the knowledge base or from an external database), insurance policy related data for the caller may be retrieved (e.g., insurance type, premium payments, and/or the like), caller demographics data may be retrieved (e.g., state, city, county, country), issue data relating to a potential issue that the caller is calling about may be retrieved (e.g., a unique issue identifier, a unique user identifier, a unique customer service agent identifier, an identification of a predicted call intent, keywords identified from user input provided for the call, a text summary generated based at least in part on user-provided input, a description of the issue (e.g., a transcribed textual representation of audio-input provided by the user), an identification of a mode of communication, an identification of whether a virtual agent is involved, a predicted time of the call, an actual time of the call, a number of call redirections, a number of times the call was dropped, a call language, an amount of time predicted to be spent on empathetic communication with the caller, a caller location, an identifier indicative of background noise of the caller, and/or the like). Moreover, additional data regarding features to be enriched for a call encompass agent-specific data, such as a unique agent identifier, an agent name, an identification of an agent's experience, an agent type identifier, an agent accent identifier, an agent location, an identification of the amount of background noise from the agent, and/or the like. Call center dynamics data may additionally be provided as feature enrichment data, including, for example, a call center identifier, a year identifier, a month identifier, a day-of-week identifier, a local time, an average speed of answering calls, an average call waiting time, an average call hold time, an average number of available agents, an average number of call transfers between agents, an average number of dropped calls, and/or the like.

The feature enrichment data provided to support the keywords and/or the text summary generated based at least in part on the audio-input provided by the user may be utilized as input for one or more machine-learning models, for example, for determining a predicted call duration. As inferred above, the feature enrichment data may be stored (e.g., temporarily) together with additional call-specific data in a memory, such that the entirety of the call-specific data (e.g., inclusive of the feature enrichment data, the text summary data, the keywords data, and/or the like) or portions thereof, may be provided as input to one or more machine-learning models.

Call Intent Recognition Model Construction

One or more machine-learning based models may be utilized in certain embodiments for a call intent recognition model. For example, a hierarchical long short-term memory (HLSTM) network for caller intent classification/determination may be utilized, with a word-level LSTM is used to model an utterance and a sentence-level LSTM to model the contextual dependence between sentences. Moreover, a memory module is utilized in this network to enhance the capability of context modelling.

In certain embodiments, the intent recognition model utilizes a HLSTM network. The HLSTM network is built based at least in part on domain knowledge stored within the knowledge base 230, user description data for a caller and labeled intent data stored within the knowledge base 230. The model is configured to model hierarchical structures within sequential data. In context of texts, these hierarchies constitute characters at the lowest level combining to form words and words combining to form sentences. The HLSTM model utilizes weights assigned to various data input types to accurately predict a call intent.

The training data for the call intent recognition model comprises user-specific data of a caller, text summary data generated based at least in part on the caller-provided input, and keywords extracted from the caller-provided input. In certain embodiments, label data indicative of an intent is manually labeled to assist in generating a supervised training data set for the call intent recognition model.

Automated Call Duration Prediction

Figure 6:
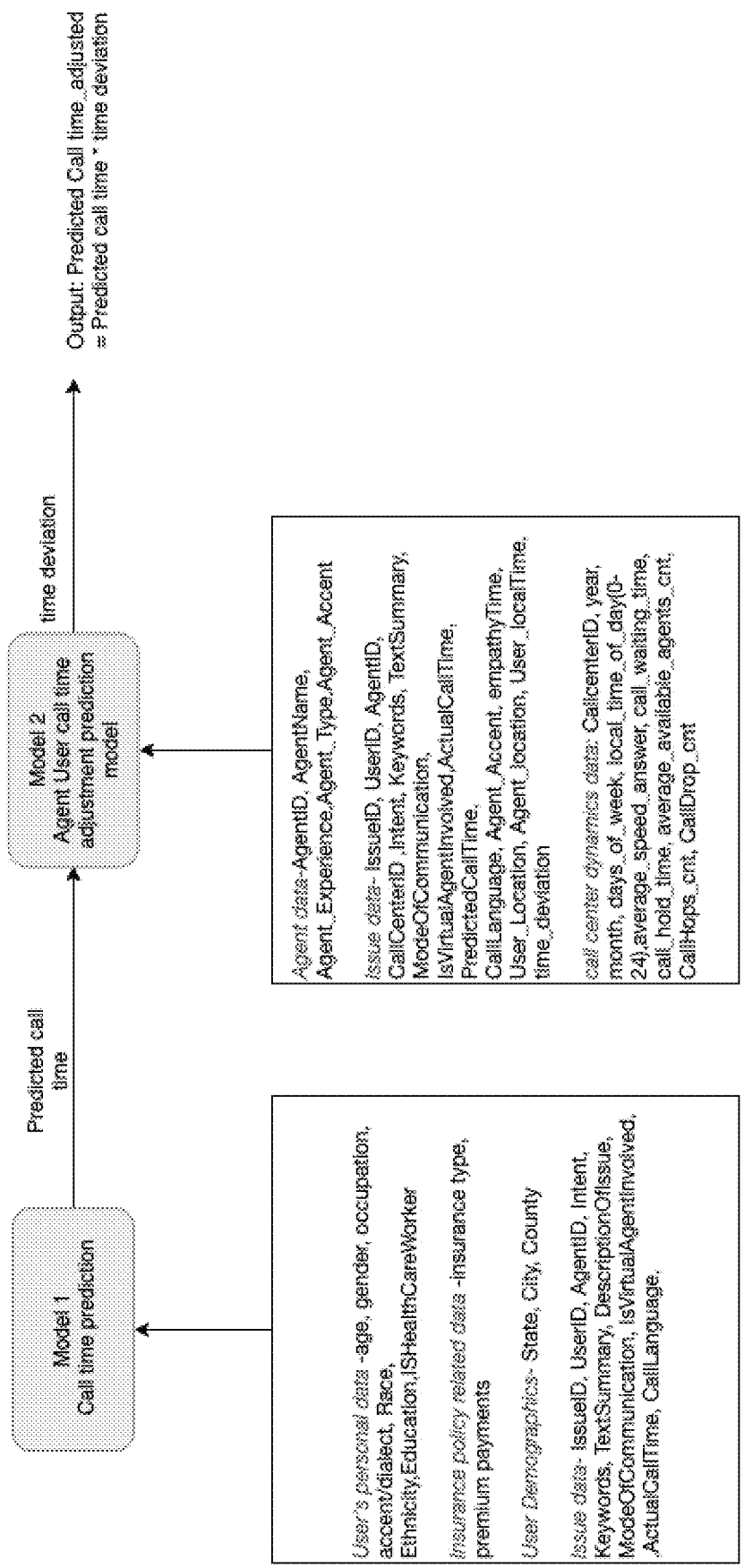
FIG. 6 illustrates portions of an example call duration prediction model according to certain embodiments.
Figure 7:
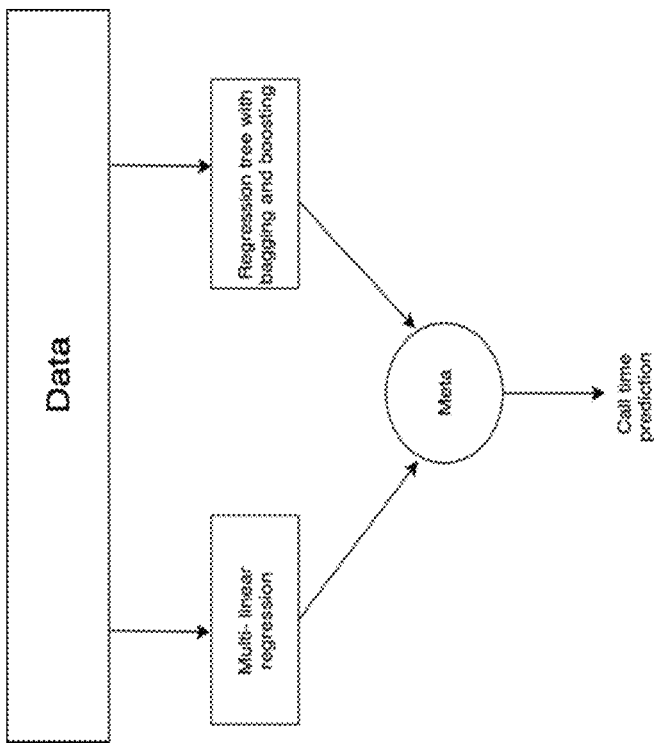
FIG. 7 is a schematic illustration of components of at least a portion of a call duration prediction model according to certain embodiments.

FIG. 6 graphically illustrates data inputs and relationships between two discrete machine-learning based models utilized to collectively identify a predicted call duration for a call. The management computing entity 10 is configured to determine a predicted call duration in real-time, while a caller remains on the line (e.g., on hold) to speak with a customer service agent, and the predicted call duration is based at least in part on the caller's intent.

As reflected in FIG. 6, a first machine-learning based model is provided as an unadjusted call duration prediction model. The first, unadjusted call duration prediction model is configured to generate an unadjusted call duration prediction based at least in part on user data, insurance policy related data, user demographics, and issue data (encompassing at least a portion of the data generated based at least in part on the audio input provided by the caller). In certain embodiments, the first unadjusted call duration prediction model is a multiple linear regression model and is configured to output a predicted call duration based on the input data. However, with reference briefly to FIG. 7, it should be understood that multiple machine-learning based models may be integrated into the determination of an unadjusted call duration prediction, with the results of each of the plurality of machine-learning based models being combined (e.g., via a weighted average calculation) to generate a single unadjusted call duration prediction. For example, a multiple-linear regression model and a regression tree model (e.g., a regression tree with bagging and boosting to weight the various input data) may each be utilized to calculate unadjusted predicted call durations, and the results of each of the models may be combined to generate an overall unadjusted predicted call duration.

A second machine-learning based model is provided to adjust the call duration prediction to consider the predicted agent-user interaction, and is configured to output a time adjustment to be applied to the unadjusted predicted call duration from the first machine learning model. The overall predicted call duration is then the sum of the predicted call duration from the first machine-learning model and the time adjustment of the second machine-learning model.

By separating the determination of the impacts of an agent-caller interaction on the overall predicted call duration, the agent-caller interaction may be considered in accordance with a separate machine-learning model type more appropriate for determining the impacts of the agent-caller interaction on the overall predicted call duration, without resulting in an overfitting problem that may result from a simultaneous consideration of an extremely high number of features in a model. Moreover, by considering the agent-caller interaction separately, calculations of agent-caller interactions can easily be determined for a plurality of agents, thereby enabling the management computing entity 10 to determine a most-appropriate agent to assign to a particular caller to address the caller's issues, based at least in part on a determination that a particular agent is likely to resolve the caller's issues faster than other agents.

The second machine-learning model may be implemented as a multiple linear regression. Thus, the second machine-learning model is a different machine-learning model type than the first machine-learning model, such that each machine-learning model is specifically tailored and structured to address the data to be provided as input thereto. As indicated at FIG. 6, the second machine learning model may receive agent data, issue data, and call center dynamics data as input, and may output an adjusted time for adjusting the predicted call duration and a confidence score indicating the level of confidence associated with the predicted time adjustment.

Thus, the overall predicted call duration is based on the output of the first machine-learning based model and the second machine-learning based model, as reflected in FIG. 6. Collectively, the first machine-learning based model and the second machine-learning based model combine to provide an accurate predicted call duration, considering the caller's issue and the predicted interaction between the caller and agent.

As just one example, given the caller information of a male aged 54, a physician with a medium pace of conversation is describing his issue as "Hi, I am Mathews calling regarding a denied claim stating 'Denied because of no prior authorization found.'" From this data the management computing entity 10 has information of the user's age, gender, pace of conversation, language, accent, and/or the like. Also, the intent, keywords and an indication that the caller is not utilizing a virtual agent is extracted from the audio. This data is provided as input to the call duration prediction model (encompassing the first machine-learning model and the second machine-learning model). The unadjusted predicted call duration is determined to be 12 minutes.

Once the unadjusted predicted call duration is obtained, then for the currently available agents the predicted agent-caller call duration adjustment model is applied (the second machine-learning model). The call center dynamics details of the agent and the agent-specific details are retrieved and added as input to the second machine learning model. The agent-caller call duration adjustment prediction model is executed to determine an estimated call duration adjustment of +2 minutes based at least in part on the agent-caller compatibility, waiting time, call center dynamics, and/or the like. The overall predicted call duration is then determined to be 14 minutes (12 minutes+2 minutes adjustment). The overall construction of such a multi-model approach for determining a predicted call duration utilizing multiple machine-learning model types is illustrated in FIG. 8.

Figure 8:
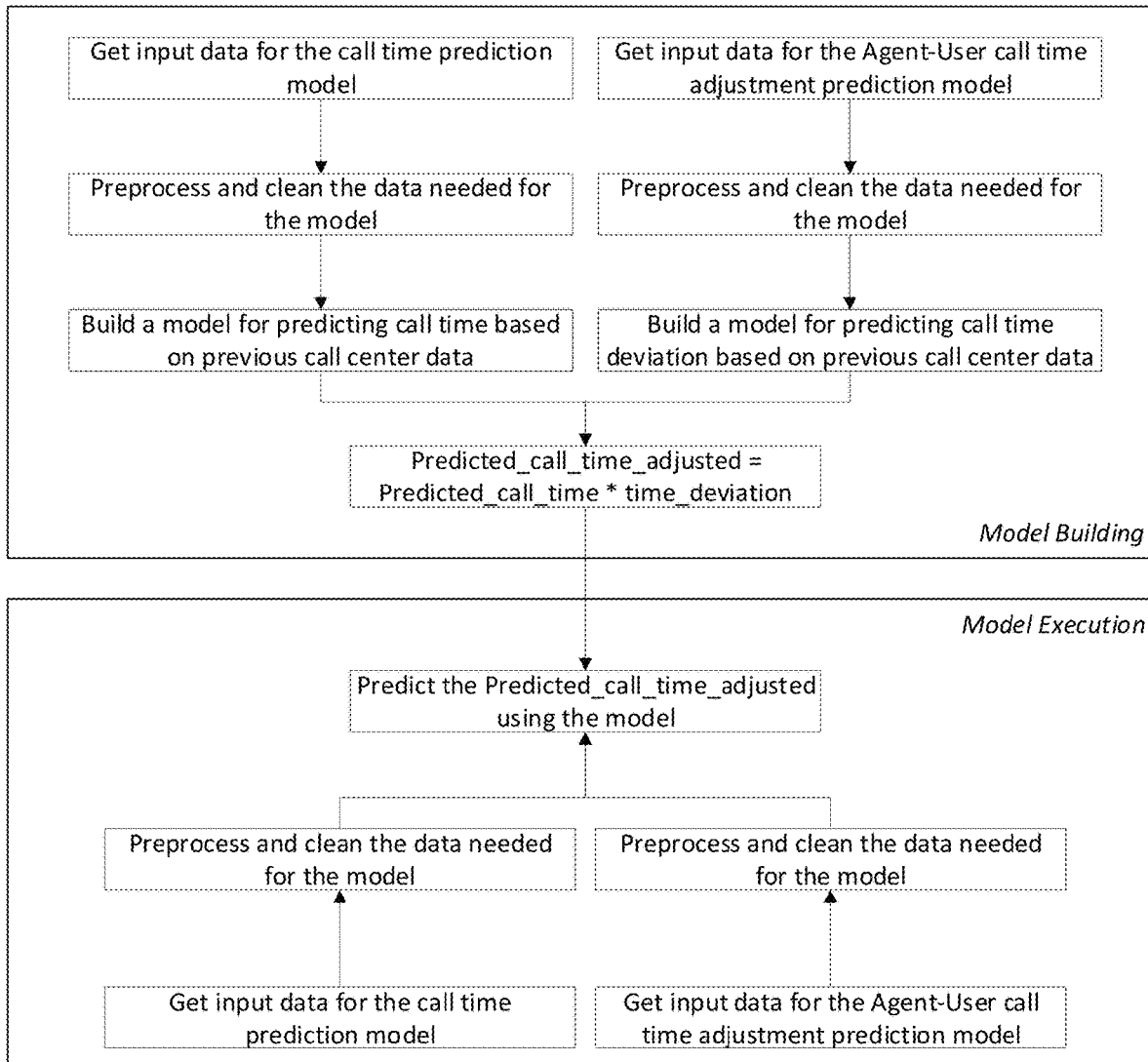
FIG. 8 is a schematic illustration processes for training and implementing a call duration prediction model according to certain embodiments.

As illustrated in FIG. 8, the models are constructed based at least in part on received input data for the call time prediction model and the agent-user call time adjustment prediction model, respectively. The input data is preprocessed prior to use as training data to construct each model, and the respective models are trained utilizing the input preprocessed training data. The trained models are then executed by first receiving respective input data for each model, preprocessing the input data, executing the models and combining the results of the executed models to generate a predicted call time that has been adjusted to consider the agent-caller interaction.

In certain embodiments, the predicted call duration may be generated while a caller remains on hold, and so the overall predicted call duration may be further adjusted to include a predicted hold duration. The predicted hold duration may be calculated based at least in part on predicted call durations of callers currently speaking with customer service agents and/or callers ahead of a current caller in a queue to speak with a customer service agent. Thus, a calculated predicted call duration may be utilized both for a current caller as well as other callers waiting to speak with a customer service agent, thereby providing highly accurate predicted call durations for callers waiting on hold. In certain embodiments, the management computing entity 10 may periodically provide updated predicted call duration to callers (e.g., once the user first enters an on-hold queue, when the user is first connected with a customer service agent, and/or the like).

Predicted Call Duration Model Construction

FIG. 8 illustrates the data inputs utilized for building and training models for predicting a call duration as well as inputs for executing the models for predicting a call duration. Because the models for predicting a call duration encompass two discrete models including an unadjusted call duration prediction model and a call duration adjustment model, training and execution of these models encompasses discrete training and execution processes.

The first machine learning model for generating an unadjusted predicted call duration is configured to predict the call duration based at least in part on the caller's personal data, insurance policy related data, user demographics, agent data, issue data, and call center dynamic data. The unadjusted call duration prediction model may be trained in accordance with the methodology reflected in FIG. 9.

Figure 9:
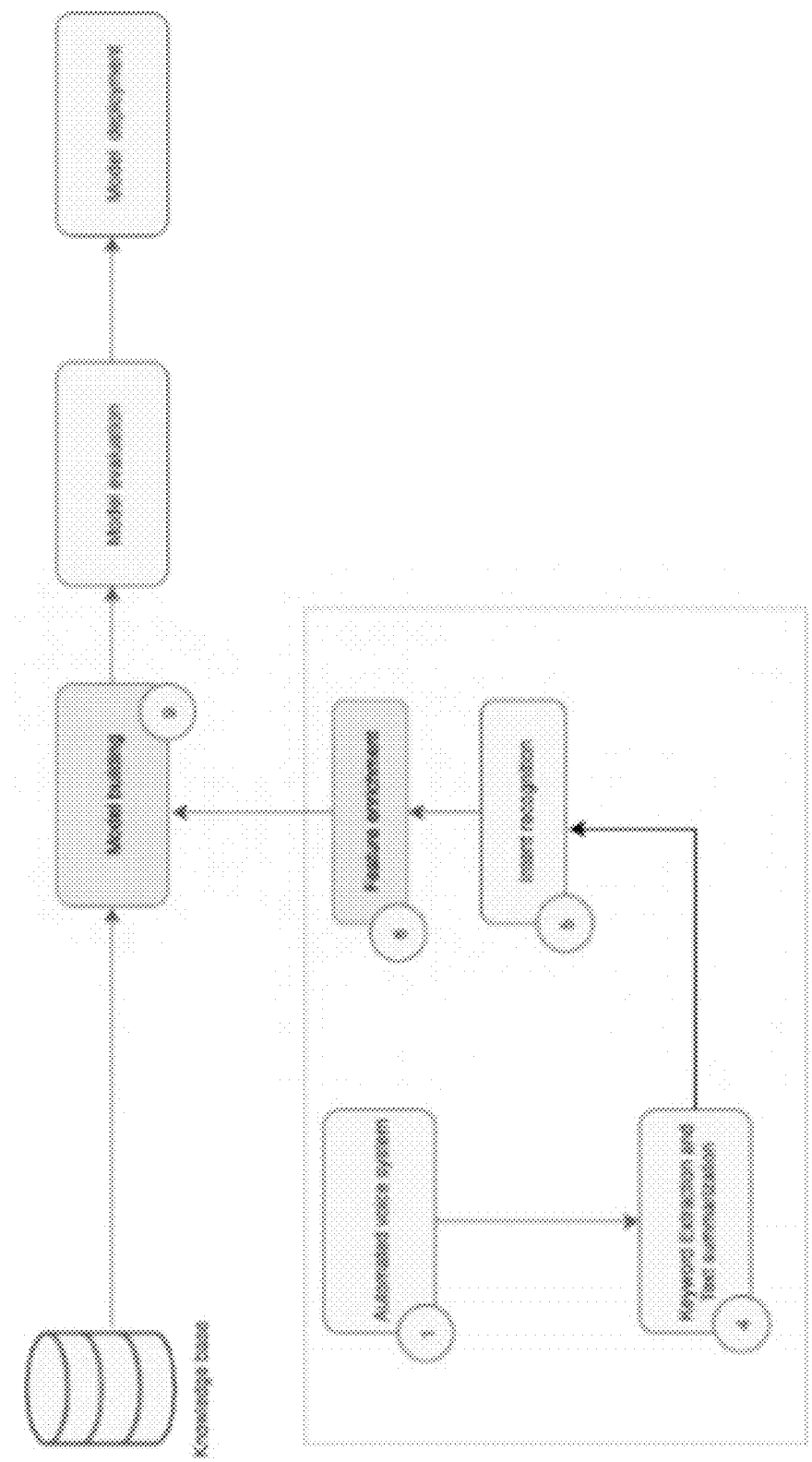
FIG. 9 is a flowchart illustrating various processes for training a machine-learning model according to certain embodiments.

As shown in FIG. 9, the first machine-learning model is trained via training data generated at least in part via the automated voice system (as discussed above, the automated voice system may be configured to transcribe textual representations of audio input provided by a caller). For the training data, transcribed text of historical calls is utilized. Similarly, the results of keyword extraction and text summarization processes executed for historical calls are retrieved and utilized as a part of the training data. As shown in FIG. 9, the results of an intent determination model are also utilized, thereby enabling the establishment of a correlation between a determined predicted intent and a predicted call time. The data provided as a part of feature enrichment for the historical call is also retrieved to be included in the training data, and all of the data retrieved as training data is utilized for model building, together with domain knowledge retrieved from the knowledge base. After training, the generated model is evaluated (e.g., by utilizing a second set of training data to evaluate the accuracy of the results) prior to deployment for use in real-time.

The unadjusted call duration prediction model utilizes context sensitive knowledge and domain knowledge for model construction. The context sensitive knowledge represents data of the caller, agent, and call center. The caller-specific data comprises user demographics, issue data, insurance policy related data (e.g., insurance type, premium payments, and/or the like). The domain knowledge comprises knowledge of the domain, such as a healthcare domain or telecom domain, variables like the call intent, keywords, text summary, and/or the like are derived based at least in part on the domain knowledge bases. These variables are derived from the description of the issue provided by the caller.

The generated model comprises a multiple-linear regression model and/or a variant thereof, such as an Elastic net regression, Ridge regression or Lasso regression. Regression trees may be utilized for at least a portion of the data analysis. The multiple linear regression model output is derived as a linear function of variables and model coefficients. The generated predicted call duration is a function of all of the variables utilized for predicting the time duration and considering an error value established during training.

The linear regression model is a global model that utilizes a single predictive formula holding over the entire data-space. When the data has a plurality of features which interact in complicated, non-linear ways, assembling a single global model can be extremely complex. An alternative is to partition the data space into smaller regions having more manageable interactions between features contained within a given space. These smaller spaces can be further subdivided through a process of recursive partitioning to generate smaller partitions of data space that are adequately manageable for simplified data models.

In certain embodiments, regression trees are utilized to construct models that are specifically relevant to a particular caller, such as by providing a decision tree that enables the construction of a caller-specific model that includes weights, data inputs, and coefficients that most accurately reflect the characteristics of a particular user. For example, binary decisions may be reflected within a regression tree, such that specific characteristics of a caller (selected from a binary or other higher-order set of discrete options) may be utilized to identify a most relevant model and/or model configuration for a particular caller.

In certain embodiments, the first machine-learning model may itself comprise a plurality of model types, and the output of the first machine-learning model may be an average (or other combination) of outputs of each of the multiple sub-models, which may be weighted as determined to be most relevant for the particular caller. As discussed above, the resulting output of the first-machine learning model may be an unadjusted call duration prediction that may be further adjusted based on the output of the second machine-learning model generating an adjustment time to be applied to the overall call duration prediction.

The second machine learning model generates an output reflecting an agent-caller call duration adjustment prediction. The agent-caller call duration adjustment prediction model is provided to increase the accuracy of a call duration prediction model by considering details of available customer-service agents that the caller may be routed to. The second machine learning model may also be utilized to suggest a best match of an agent-caller that reduces the call duration based at least in part on issues, call duration, agent experience, and/or the like for addressing the issues of the caller (as well as addressing other aspects of the caller). Additionally, the second machine learning model may consider differences in time of day, such as differences in average time for an agent to answer a call at different times of day.

The second machine learning model intakes data such as agent data, issue data, and call center dynamics data, and the second machine learning model outputs a value for a predicted time adjustment between the predicted call duration as generated by the first machine learning model and an overall predicted call duration, considering the agent's experience and predicted interaction with the caller.

In certain embodiments, the second machine learning model is embodied as a multiple linear regression, such that the predicted call duration adjustment is a function of the input variables and corresponding coefficients of the model, as well as an error value determined for the model.

Call Intent Knowledge Graph Generation

As discussed herein, upon a determination that a predicted call intent or a predicted call duration has a corresponding confidence score that does not satisfy applicable confidence criteria, the management computing entity 10 (via the automated voice system) presents the caller with additional inquiries to extract additional information from the caller regarding the caller's intent. The management computing entity 10 is configured to generate and/or select an inquiry to be presented to the caller to collect additional information that is likely to lead to a predicted caller intent and predicted call duration with confidence scores satisfying applicable confidence criteria.

Figure 10:
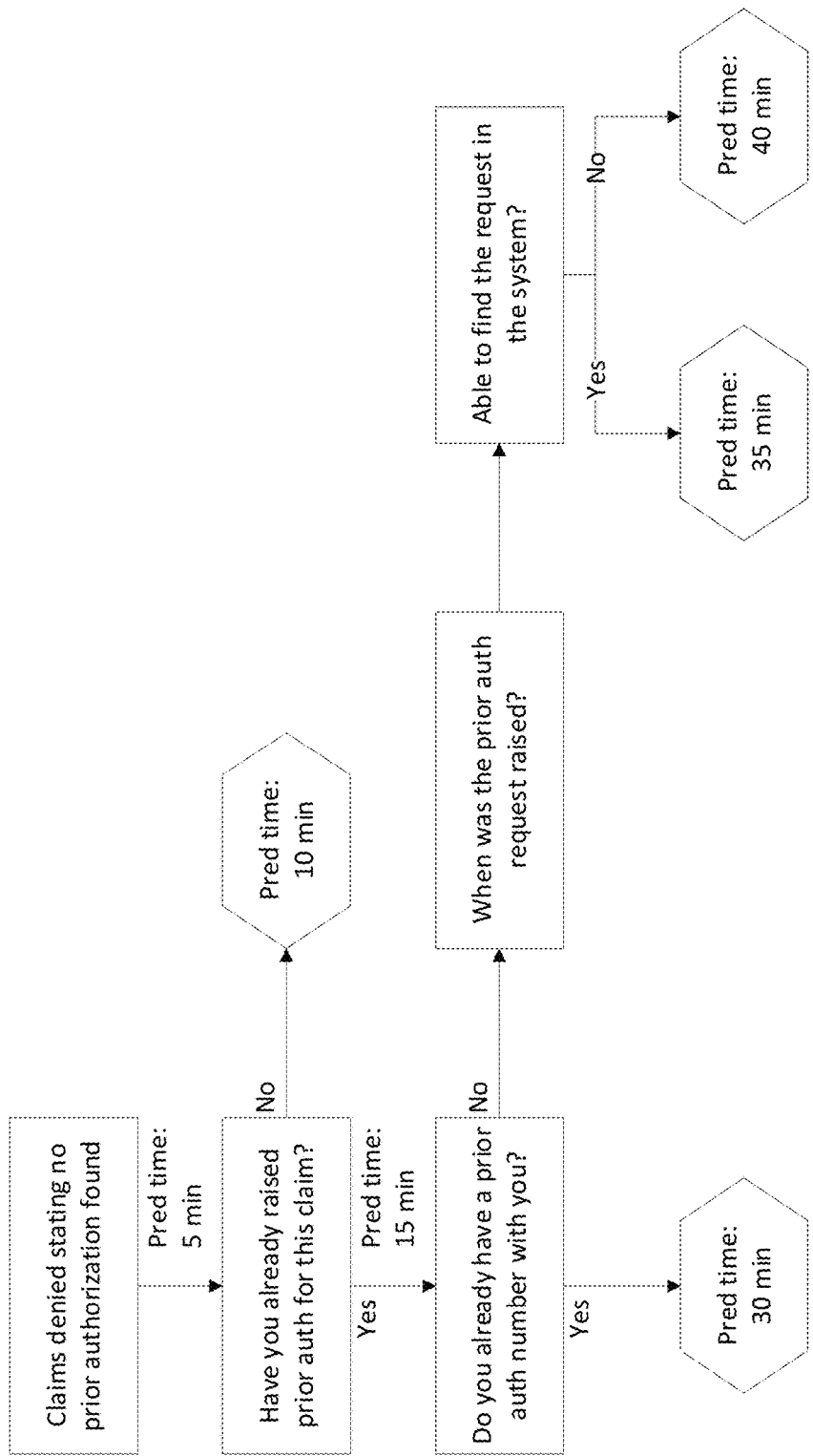
FIG. 10 illustrates data within an example knowledge graph according to one embodiment.

With reference to the example of FIG. 10, the management computing entity 10 stores knowledge graphs presenting a plurality of available inquiries that may be presented to a caller to extract additional information to accurately predict a call intent and call duration. These knowledge graphs are stored in a graph database accessible to the management computing entity 10. Thus, although the example of FIG. 10 provides a generally sequential series of inquiries that may be asked within a particular suggested order, it should be understood that each inquiry may be linked with a plurality of additional inquiries that may be selected based at least in part on the caller's response to a previous inquiry, based on the caller's previously provided information (which may have been provided before any inquiries were presented, based on the data included within the feature extraction data, and/or the like). As reflected within the example of FIG. 10, certain answers to particular inquiries may impact the predicted call duration for a call to address the caller's issues. However, it should be understood that predicted call durations may be determined in real-time, and such predicted call durations may not be permanently established in association with particular inquiry answers.

The knowledge graphs may be generated and/or updated periodically. For example, data may be generated and stored over time that indicates how quickly a particular knowledge graph and/or set of inquiries typically results in a call intent model confidence score that satisfies applicable confidence criteria. The knowledge graph may be periodically updated to minimize the amount of inquiries required to generate a predicted call intent having a confidence score satisfying applicable criteria. The knowledge graphs may be updated manually or automatically, such as through machine-learning based models utilized to select and/or generate an appropriate order of inquiries, or to generate optimal inquiry/question phrasing to obtain information from callers.

Automated Interactions with a Caller Based on Identified Intent and Call-Time Prediction The management computing entity 10 is configured to utilize the predicted call intent and the predicted call duration (once each prediction satisfies corresponding confidence criteria) to provide the caller with information regarding the predicted call duration, to assist in scheduling a later callback to complete the caller's intent, to route calls to a most-appropriate customer service agent, and/or the like.

In certain embodiments, the predicted call intent may be utilized to initially route the caller to a subset of a plurality of available customer service agents having appropriate expertise to handle the caller's intent. The predicted call duration may then be calculated for each of the subset of the plurality of available customer service agents to identify the customer service agent having the lowest overall predicted call duration. As mentioned above, the determination of a predicted call duration for a particular agent considers the predicted agent-caller interaction, and therefore the most optimal agent for a particular caller may not necessarily be the most experienced in a particular area, but instead may be the customer service agent most likely to efficiently interact with the caller (e.g., considering the accent of the caller and the accent of the customer service agent, the customer service agent's ability to connect with callers from the caller's geographic area, and/or the like).

In certain embodiments, routing a caller to a particular customer service agent may additionally consider the total predicted amount of time for the call, including the adjusted predicted call duration with the customer service agent as well as the hold times associated with each customer service agent. For example, while a first customer service agent may have a lower adjusted predicted call duration than a second customer service agent, the second customer service agent may have a drastically shorter hold time in queue, and therefore the caller may be routed to the second customer service agent such that the overall time that the caller is on the phone is minimized.

It should be understood that in certain embodiments, determinations of a predicted call duration may be performed after the call is routed to a queue for a particular customer service agent, and the determination of a predicted call duration may be provided for information purposes for the caller, and may be provided together with an option to call back later based on the provided predicted call duration. In such embodiments, the determinations of a predicted call duration may be performed while the caller is on hold. The caller may be provided with an option (e.g., to be selected via a voice-operated system or a touch-tone system) to participate in a call duration prediction interaction with the management computing entity 10 while the caller waits on hold (the management computing entity 10 may provide an indication that the caller will not lose his/her place in the queue by participating). The caller may then provide additional information about the intent of the call, and the management computing entity 10 may provide audio output to the caller requesting additional detail to be utilized by the one or more machine-learning models to predict a call duration for the caller.

In certain embodiments, once the predicted call during is generated, the predicted call duration is presented to the caller. The predicted call duration is presented to the caller together with one or more options for continuing the current call, or scheduling a later call to complete the interaction, based at least in part on the predicted call duration. For example, the management computing entity 10 may present the caller with the option to call back later if the predicted call duration is longer than the caller currently has available to complete the interaction. In another example, the management computing entity 10 may present the user with the option to schedule a callback for a customer service agent to call the caller at a time convenient for the caller. In such embodiments, the caller may provide the management computing entity 10 with access to the caller's schedule (e.g., via a data sharing communication protocol for internet-based connections (e.g., via an app executing on the caller's user computing entity 20), via a separate external permission provided to the call center to enable access to the caller's calendar stored in a separate application (e.g., a cloud-stored calendar application). An example system and method for automatically scheduling a callback call is described in co-pending U.S. application Ser. No. 17/448,001, filed concurrently herewith, the contents of which are incorporated herein by reference in their entirety.

Example Implementation

Figure 11:
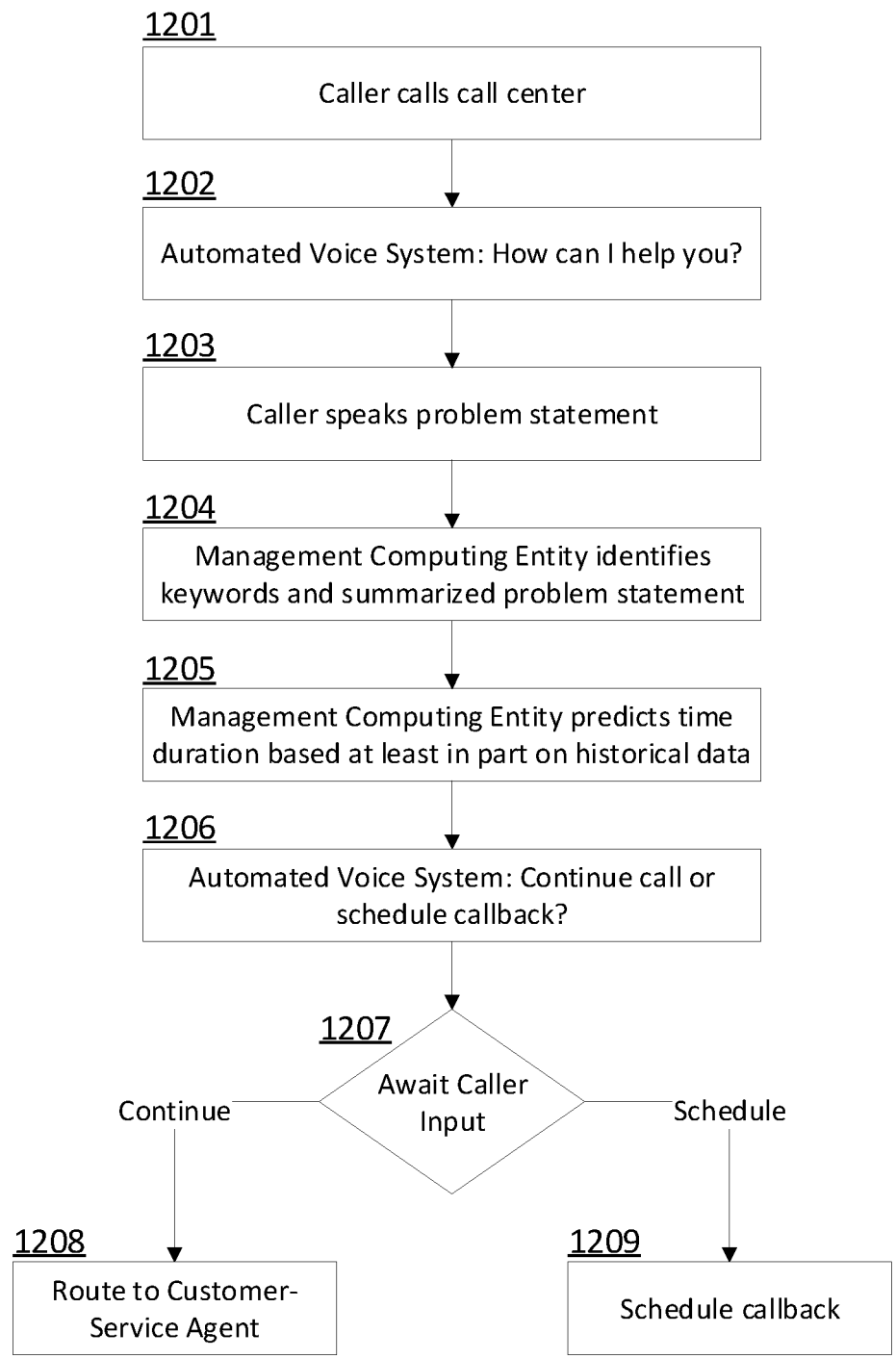
FIG. 11 is a flowchart illustrating an implementation of various features during a real-time interaction between a caller and a call center, according to one embodiment.

FIG. 11 is a flowchart providing a summary overview of an interaction between a caller and a call center of an organization implementing embodiments and/or features discussed above. The various features are executed during a single interaction between the caller and the call center, and therefore certain features are executed in real-time, whereas other features include and/or utilize previously generated and/or previously retrieved data to improve the caller experience by reducing perceived delays of the various automated features discussed herein.

An interaction begins when a caller calls (or otherwise initiates a communication channel) with the call center, as shown at Block 1201. As mentioned herein, a call may be a telephonic call, an internet-based call (e.g., initiated via an organization-specific app executing on the caller's user computing entity), and/or the like. The call to the call center is first directed to an automated voice system that provides call routing functionality, call intent prediction functionality, call duration prediction functionality, and/or the like. The automated voice system first requests the caller provide a generic problem statement, such as via an audio output prompt such as "How can I help you?" provided to the caller (as reflected in Block 1202). The caller provides an audio-based input (e.g., by speaking a description of the issue to be resolved during the call), as shown at Block 1203. The management computing entity 10, which executes the automated voice system and other functionalities as discussed herein, executes appropriate models as discussed herein for transcribing the audio-input provided by the user, identifying keywords within the audio input (e.g., via TF-IDF analysis), generating a summary of the problem statement provided by the caller, and/or the like, as shown at Block 1204.

The management computing entity 10 then executes various models for determining a predicted call duration for resolution of the issue presented by the caller. As discussed herein, determining a predicted call duration encompasses one or more intermediate analyses, such as by first predicting the call intent based at least in part on data provided by the caller (and feature enrichment data, as utilized in certain embodiments). In certain embodiments, determining a predicted call intent may be an iterative process, such as by predicting a call intent, determining a confidence score associated with the predicted call intent, and requesting additional clarifying information from the caller via one or more generated inquiries if the confidence score does not satisfy applicable criteria. As reflected specifically in Block 1205, the management computing entity 10 determines a predicted call duration, utilizing one or more (e.g., two or more) machine learning models for determining a predicted call duration. In certain embodiments, the management computing entity 10 determines a plurality of predicted call durations, including a first predicted call duration if the user remains on the current call to reach a resolution of the issue, and a second predicted call duration if the user opts to schedule a callback to reach a resolution of the issue. As discussed herein, the determination of a predicted call duration proceeds in real-time, based at least in part on the data received from the caller as well as the determined predicted call intent, and the determination of a predicted call duration encompasses execution of a plurality of machine-learning models for collectively determining an unadjusted predicted call duration and a predicted call time adjustment based at least in part on the customer service agent assigned to address the caller's issues as well as additional feature enrichment data (e.g., call center dynamics data, and/or the like) that may vary based at least in part on when the caller is calling the call center, what customer service agent is assigned to address the caller's issues, and/or the like.

The automated voice system (executing on the management computing entity 10) presents the caller with the predicted call duration(s), and requests input from the caller about whether to remain on the current call or the schedule a callback, as reflected at Blocks 1206-1207. If the caller opts to remain on the current call, the caller is connected with a customer service agent, as reflected at Block 1208 (e.g., after waiting on hold, if necessary). If the caller opts to schedule a callback, the management computing entity 10 (via the scheduler) identifies one or more candidate timeslots, such as based at least in part on calendar data associated with the caller, and the automated voice system presents the one or more candidate timeslots to the caller. The caller selects one of the candidate timeslots, and as indicated at Block 1209, the management computing entity 10 completes the process for scheduling a callback. A customer service agent (the assigned customer service agent) then calls the caller back at the scheduled call time to resolve the caller's issues.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

As mentioned herein, embodiments discussed herein are specifically discussed in reference to audio-based interactions between a caller and a call center of an organization. However, embodiments as discussed herein may be implemented for execution via other forms of communication between a caller and the call center, such as text-based interactions of an online, real-time chat functionality between the caller and the call center (e.g., via automated systems responding via the text-based chat functional and/or via a customer service agent responding to caller text-based chats. Interactions between a caller and the call center may be performed via other alternative forms of real-time communication beyond audio-based and text-based interactions.

That which is claimed:
1. A system comprising:
at least one memory; and
one or more processors communicatively coupled to the at least one memory, the one or more processors configured to:
receive audio input for an active call from a caller;
generate transcription data of the audio input;
extract one or more keywords from the transcription data;
determine, by processing the one or more keywords using a machine-learning intent model, a call intent corresponding to the active call;

execute an interaction-time prediction model at least in part by:
    identifying an identity of a customer service agent assigned to the active call;
    determining, by processing the call intent using a first machine-learning time model, an unadjusted time duration estimate associated with the call intent,
    determining, by processing agent data corresponding to the identity of the customer service agent assigned to the active call using a second machine-learning time model, an interaction time adjustment duration, and
    determining, by combining the unadjusted time duration estimate and the interaction time adjustment duration, an interaction-time prediction; and
transmit, to a user device of the caller, an output for display via the user device of the caller indicating the interaction-time prediction and a selectable option for the caller to request a call-back at a later time based on calendar data associated with the caller.

2. The system of claim 1, wherein the one or more processors are further configured to extract the one or more keywords from the transcription data at least in part by executing a term-frequency, inverse-document frequency (TF-IDF) algorithm to identify keywords within a corpus of historical training data, wherein the historical training data comprises historical transcription data generated during a plurality of historical calls.

3. The system of claim 1, wherein using the machine-learning intent model comprises determining, based at least in part on the one or more keywords, the call intent and a corresponding call intent score at least in part by:
    executing a first iteration of the machine-learning intent model based at least in part on initial audio input provided by the caller to generate a first iteration call intent and corresponding first iteration call intent score;
    determining whether the first iteration call intent score satisfies one or more inquiry criteria;
    upon determining that the first iteration call intent score satisfies one or more inquiry criteria, determining one or more inquiries based at least in part on a knowledge graph stored in a graph database;
    presenting an audio output of the one or more inquiries;
    receiving additional audio input in response to presenting the audio output of the one or more inquiries;
    executing a second iteration of the machine-learning intent model based at least in part on the additional audio input to generate a second iteration call intent and a corresponding second iteration call intent score; and
    iterating the machine-learning intent model until a generated call intent score satisfies the one or more inquiry criteria.

4. The system of claim 1, wherein the one or more processors are further configured to execute the interaction-time prediction model at least in part by:
    determining, by processing the call intent using an empathy analysis model, an empathy time; and
    adding the empathy time to the unadjusted time duration estimate.

5. The system of claim 1, wherein the first machine-learning time model comprises a different machine-learning model type than the second machine-learning time model.

6. The system of claim 5, wherein the first machine-learning time model comprises a multiple-linear regression model and a regression tree model, and the second machine-learning time model comprises a multiple-linear regression model.

7. The system of claim 1, wherein the second machine-learning time model is configured to generate the interaction time adjustment duration based at least in part on one or more of: attributes of the customer service agent, attributes of the caller, or call center dynamics.

8. The system of claim 1, wherein the interaction-time prediction is a first interaction-time prediction for continuing the active call, and wherein the one or more processors are further configured to:
    execute a second-iteration of the interaction-time prediction model to generate a second interaction-time prediction for a callback occurring at a defined future time.

9. The system of claim 1, wherein the one or more processors are further configured to receive feature enrichment data stored in the at least one memory, and the interaction-time prediction model executes the first machine-learning time model and the second machine-learning time model based at least in part on the feature enrichment data.

10. The system of claim 1, wherein the one or more processors are further configured to receive the audio input at least in part by receiving audio input of a virtual assistant representing the caller, and wherein using the second machine-learning time model comprises determining the interaction time adjustment duration based at least in part on the identity of the customer service agent assigned to the active call and an effectiveness quality measure of the virtual assistant.

11. A computer-implemented method comprising:
    receiving, by one or more processors, audio input for an active call from a caller;
    generating transcription data of the audio input;
    extracting, by the one or more processors, one or more keywords from the transcription data;
    determining, by processing the one or more keywords using a machine-learning intent model, a call intent corresponding to the active call;
    executing, by the one or more processors, an interaction-time prediction model at least in part by:
        identifying an identity of a customer service agent assigned to the active call;
        determining, by processing the call intent using a first machine-learning time model, an unadjusted time duration estimate associated with the call intent,
        determining, by processing agent data corresponding to the identity of the customer service agent assigned to the active call using a second machine-learning time model, an interaction time adjustment duration, and
        determining, by combining the unadjusted time duration estimate and the interaction time adjustment duration, an interaction-time prediction; and
    transmitting, by the one or more processors and to a user device of the caller, an output for display via the user device of the caller indicating the interaction-time prediction and a selectable option for the caller to request a call-back at a later time based on calendar data associated with the caller.

12. The computer-implemented method of claim 11, wherein extracting the one or more keywords from the transcription data comprises executing a term-frequency, inverse-document frequency (TF-IDF) algorithm to identify keywords within a corpus of historical training data, wherein the historical training data comprises historical transcription data generated during a plurality of historical calls.

13. The computer-implemented method of claim 11, wherein using the machine-learning intent model comprises determining, based at least in part on the one or more keywords, the call intent and a corresponding call intent score at least in part by:
executing a first iteration of the machine-learning intent model based at least in part on initial audio input provided by the caller to generate a first iteration call intent and corresponding first iteration call intent score;
determining whether the first iteration call intent score satisfies one or more inquiry criteria;
upon determining that the first iteration call intent score satisfies the one or more inquiry criteria, determining one or more inquiries based at least in part on a knowledge graph stored in a graph database;
presenting an audio output of the one or more inquiries;
receiving additional audio input in response to presenting the audio output of the one or more inquiries;
executing a second iteration of the machine-learning intent model based at least in part on the additional audio input to generate a second iteration call intent and a corresponding second iteration call intent score; and
iterating the machine-learning intent model until a generated call intent score satisfies the one or more inquiry criteria.

14. The computer-implemented method of claim 11, wherein executing the interaction-time prediction model further comprises executing an empathy analysis model based at least in part on the call intent to determine an empathy time; and
wherein using the first machine-learning time model further comprises adding the empathy time to the unadjusted time duration estimate.

15. The computer-implemented method of claim 11, wherein the first machine-learning time model comprises a different machine-learning model type than the second machine-learning time model.

16. The computer-implemented method of claim 15, wherein the first machine-learning time model comprises a multiple-linear regression model and a regression tree model, and the second machine-learning time model comprises a multiple-linear regression model.

17. The computer-implemented method of claim 11, wherein the second machine-learning time model is configured to generate the interaction time adjustment duration based at least in part on one or more of: attributes of the customer service agent, attributes of the caller, or call center dynamics.

18. The computer-implemented method of claim 11, wherein the interaction-time prediction is a first interaction-time prediction for continuing the active call, and wherein the computer-implemented method further comprises:
executing a second-iteration of the interaction-time prediction model to generate a second interaction-time prediction for a callback occurring at a defined future time.

19. The computer-implemented method of claim 11, further comprising: receiving feature enrichment data, and the interaction-time prediction model executes the first machine-learning time model and the second machine-learning time model based at least in part on the feature enrichment data.

20. The computer-implemented method of claim 11, wherein receiving the audio input further comprises receiving audio input of a virtual assistant representing the caller, and wherein using the second machine-learning time model comprises determining the interaction time adjustment duration based at least in part on the identity of the customer service agent assigned to the active call and an effectiveness quality measure of the virtual assistant.

21. A computer program product comprising at least one non-transitory computer-readable storage medium having computer-readable program code portions stored therein, the computer-readable program code portions configured to:
receive audio input for an active call from a caller;
generate transcription data of the audio input;
extract one or more keywords from the transcription data;
determine, by processing the one or more keywords using a machine-learning intent model, a call intent corresponding to the active call;
execute an interaction-time prediction model at least in part by:
identifying an identity of a customer service agent assigned to the active call;
determining, by processing the call intent using a first machine-learning time model, an unadjusted time duration estimate associated with the call intent,
determining, by processing agent data corresponding to the identity of the customer service agent assigned to the active call using a second machine-learning time model, an interaction time adjustment duration, and
determining, by combining the unadjusted time duration estimate and the interaction time adjustment duration, an interaction-time prediction; and
transmit, to a user device of the caller, an output for display via the user device of the caller indicating the interaction-time prediction and a selectable option for the caller to request a call-back at a later time based on calendar data associated with the caller.

22. The computer program product of claim 21, wherein the computer-readable program code portions are further configured to extract the one or more keywords from the transcription data at least in part by executing a term-frequency, inverse-document frequency (TF-IDF) algorithm to identify keywords within a corpus of historical training data, wherein the historical training data comprises historical transcription data generated during a plurality of historical calls.

23. The computer program product of claim 21, wherein using the machine-learning intent model comprises determining, based at least in part on the one or more keywords, the call intent and a corresponding call intent score at least in part by:
executing a first iteration of the machine-learning intent model based at least in part on initial audio input provided by the caller to generate a first iteration call intent and corresponding first iteration call intent score;
determining whether the first iteration call intent score satisfies one or more inquiry criteria;
upon determining that the first iteration call intent score satisfies the one or more inquiry criteria, determining one or more inquiries based at least in part on a knowledge graph stored in a graph database;
presenting an audio output of the one or more inquiries;
receiving additional audio input in response to presenting the audio output of the one or more inquiries;
executing a second iteration of the machine-learning intent model based at least in part on the additional audio input to generate a second iteration call intent and a corresponding second iteration call intent score; and
iterating the machine-learning intent model until a generated call intent score satisfies the one or more inquiry criteria.

24. The computer program product of claim 21, wherein the computer-readable program code portions are further configured to execute the interaction-time prediction model at least in part by executing an empathy analysis model based at least in part on the call intent to determine an empathy time; and
wherein using the first machine-learning time model additionally further comprises adding the empathy time to the unadjusted time duration estimate.

25. The computer program product of claim 21, wherein the first machine-learning time model comprises a different machine-learning model type than the second machine-learning time model.

26. The computer program product of claim 25, wherein the first machine-learning time model comprises a multiple-linear regression model and a regression tree model, and the second machine-learning time model comprises a multiple-linear regression model.

27. The computer program product of claim 21, wherein the second machine-learning time model is configured to generate the interaction time adjustment duration based at least in part on one or more of: attributes of the customer service agent, attributes of the caller, or call center dynamics.

28. The computer program product of claim 21, wherein the interaction-time prediction is a first interaction-time prediction for continuing the active call, and wherein the computer-readable program code portions are further configured to:
execute a second-iteration of the interaction-time prediction model to generate a second interaction-time prediction for a callback occurring at a defined future time.

29. The computer program product of claim 21, wherein the computer-readable program code portions are further configured to receive feature enrichment data, and the interaction-time prediction model executes the first machine-learning time model and the second machine-learning time model based at least in part on the feature enrichment data.

* * * * *

UNITED STATES PATENT AND TRADEMARK OFFICE
CERTIFICATE OF CORRECTION

PATENT NO. : 12,288,552 B2
APPLICATION NO. : 17/478157
DATED : April 29, 2025
INVENTOR(S) : Vivedha Elango et al.

Page 1 of 1

It is certified that error appears in the above-identified patent and that said Letters Patent is hereby corrected as shown below:

In the Claims

In Column 35, Line 43, Claim 3, delete "satisfies one" and insert -- satisfies the one --, therefor.

In Column 37, Line 9, Claim 13, delete "and" and insert -- and a --, therefor.

In Column 38, Line 51, Claim 23, delete "and" and insert -- and a --, therefor.

Signed and Sealed this
Fifth Day of August, 2025

Coke Morgan Stewart
*Acting Director of the United States Patent and Trademark Office*